US012776277B2

(12) United States Patent
Yu et al.

(10) Patent No.: US 12,776,277 B2
(45) **Date of Patent: *Oct. 27, 2026**

(54) DRIVING CIRCUIT, DRIVING METHOD, DRIVING MODULE AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Ziyang Yu, Beijing (CN); Ming Hu, Beijing (CN); Zhiliang Jiang, Beijing (CN); Haijun Qiu, Beijing (CN); Long Ma, Beijing (CN); Tianyi Cheng, Beijing (CN); Jianpeng Wu, Beijing (CN); Wenbo Chen, Beijing (CN); Qingqing Yan, Beijing (CN); Xiangnan Pan, Beijing (CN); Qing He, Beijing (CN); Quanyong Gu, Beijing (CN); Pan Zhao, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/223,219

(22) Filed: May 30, 2025

(65) Prior Publication Data

US 2025/0292736 A1 Sep. 18, 2025

Related U.S. Application Data

(63) Continuation of application No. 18/577,408, filed as application No. PCT/CN2023/084609 on Mar. 29, 2023, now Pat. No. 12,340,753.

(51) Int. Cl.
*G09G 3/3258* (2016.01)

(52) U.S. Cl.
CPC ... *G09G 3/3258* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01);
(Continued)

(58) Field of Classification Search
CPC ......... G09G 3/3233; G09G 2310/0286; G09G 2300/0842; G09G 2310/08; G09G 3/3266
See application file for complete search history.

(56) References Cited

U.S. PATENT DOCUMENTS 11,705,038 B2 * 7/2023 Yao .......................... G09G 5/18 345/214
12,217,650 B2 * 2/2025 Li ............................ G09G 3/32
2021/0377717 A1 * 12/2021 Zong .................. H04M 1/0202
(Continued)

*Primary Examiner* — Van N Chow
(74) *Attorney, Agent, or Firm* — WHDA, LLP

(57) ABSTRACT

A driving circuit, a driving method, a driving module and a display device are provided. The driving circuit includes a driving signal generation circuit, a gating circuit, an output control circuit, an output circuit, a voltage control circuit and a third control node control circuit. The third control node control circuit is electrically connected to the first node and the third control node respectively, and is configured to control the potential of the third control node according to the potential of the first node.

20 Claims, 21 Drawing Sheets

(52) U.S. Cl.
CPC ............... *G09G 2320/0233* (2013.01); *G09G 2330/021* (2013.01)

(56) References Cited

U.S. PATENT DOCUMENTS

| | | | | |
|---|---|---|---|---|
| 2024/0135882 | A1* | 4/2024 | Yuan | G09G 3/3258 |
| 2024/0221584 | A1* | 7/2024 | Li | G09G 3/20 |
| 2024/0221642 | A1* | 7/2024 | Wang | G09G 3/3233 |
| 2024/0296768 | A1* | 9/2024 | Jin | G09G 3/3677 |
| 2024/0321161 | A1* | 9/2024 | Zhang | G09G 3/3225 |
| 2024/0379062 | A1* | 11/2024 | Huang | H10K 59/1201 |

* cited by examiner

DRIVING CIRCUIT, DRIVING METHOD, DRIVING MODULE AND DISPLAY DEVICE

CROSS-REFERENCE TO RELATED APPLICATION

This application is a continuation application of a U.S. patent application Ser. No. 18/577,408 filed on Jan. 8, 2024, which is the U.S. national phase of PCT Application No. PCT/CN2023/084609 filed on Mar. 29, 2023, which are incorporated herein by reference in their entireties.

TECHNICAL FIELD

The present disclosure relates to the field of display technology, in particular to a driving circuit, a driving method, a driving module and a display device.

BACKGROUND

In related technologies, when an organic light-emitting diode (OLED) display updates an image, it is necessary to initialize and write pixel voltages to all rows of pixel circuits within one frame. And in some special images (such as the screen AOD display image, the screen AOD display screen is an image that controls the partial lighting of the screen without lighting up the entire mobile phone screen, static images or rarely updated images), most of the pixel circuits of the entire screen do not need to update the pixel voltage, that is, most of the pixel circuits can maintain the original display brightness through low-leakage (low-temperature polycrystalline oxide (LTPO) thin film transistor (TFT). Repeated flashing of such pixel circuits causes a waste of power consumption.

SUMMARY

In one aspect, the present disclosure provides in some embodiments a driving circuit, including a driving signal generation circuit, an output control circuit, a gating circuit, a voltage control circuit, an output circuit and a third control node control circuit; wherein the driving signal generation circuit is electrically connected to a first control node, a second control node and an Nth stage of driving signal output terminal respectively, and is configured to generate and output an Nth stage of driving signal through the Nth stage of driving signal output terminal under the control of a potential of the first control node and a potential of the second control node; N is a positive integer; the output control circuit is electrically connected to a first node, the first control node and a second node respectively, and is configured to control to connect the first control node and the second node under the control of a potential of the first node; the gating circuit is electrically connected to a gating control terminal, a gating input terminal and the first node respectively, and is configured to control to write a gating input signal provided by the gating input terminal into the first node under the control of a gating control signal provided by the gating control terminal; the voltage control circuit is electrically connected to the first node and the second node respectively, and is configured to control a potential of the second node according to the potential of the first node; the output circuit is electrically connected to the second node, a third control node, and an Nth stage of output driving terminal respectively, and is configured to generate and output an Nth stage of output driving signal through the Nth stage of output driving terminal under the control of the potential of the second node and a potential of the third control node; the third control node control circuit is electrically connected to the first node and the third control node respectively, and is configured to control the potential of the third control node according to the potential of the first node.

Optionally, the driving circuit further includes a third node control circuit and a fourth node control circuit; wherein the third node control circuit is configured to control a potential of a third node; the fourth node control circuit is configured to control a potential of a fourth node; the third control node control circuit is respectively connected to the third node, the first node, the fourth node, a fifth node, a sixth node, the third control node, a first voltage terminal, a second voltage terminal and a first clock signal terminal, and is configured to control to connect the first node and the second voltage terminal under the control of the potential of the third node, and control to connect the fourth node and the fifth node under the control of the potential of the first node, and control the potential of the third control node according to a potential of the fifth node, control to connect the sixth node and the first voltage terminal under the control of the potential of the third node, control to connect the sixth node and the first clock signal terminal under the control of the potential of the fifth node, and control the potential of the fifth node according to a potential of the sixth node.

Optionally, the third control node control circuit includes a first control sub-circuit, a second control sub-circuit, a third control sub-circuit, a fourth control sub-circuit and a fifth control sub-circuit; the first control sub-circuit is electrically connected to the third node, the first node and the second voltage terminal respectively, and is configured to control to connect the first node and the second voltage terminal under the control of the potential of the third node; the second control sub-circuit is electrically connected to the first node, the fourth node and the fifth node respectively, and is configured to control to connect the fourth node and the fifth node under the control of the potential of the first node; the third control sub-circuit is electrically connected to the third node, the first voltage terminal, the sixth node and the first clock signal terminal respectively, and is configured to control to connect the sixth node and the first voltage terminal under the control of the potential of the third node, and control to connect the sixth node and the first clock signal terminal under the control of the potential of the fifth node, control the potential of the fifth node according to the potential of the sixth node; the fourth control sub-circuit is electrically connected to the third control node and the fifth node respectively, and is configured to control the potential of the third control node according to the potential of the fifth node; the fifth control sub-circuit is electrically connected to the first node, a twelfth node and the third control node respectively, and is configured to control to connect the twelfth node and the third control node under the control of the potential of the first node.

Optionally, the first control sub-circuit includes a first transistor and the second control sub-circuit includes a second transistor; a gate electrode of the first transistor is electrically connected to the third node, a first electrode of the first transistor is electrically connected to the second voltage terminal, and a second electrode of the first transistor is electrically connected to the first node; a gate electrode of the second transistor is electrically connected to the first node, a first electrode of the second transistor is electrically connected to the fourth node, and a second electrode of the second transistor is electrically connected to the fifth node.

Optionally, the third control sub-circuit includes a third transistor, a fourth transistor and a first capacitor; a gate electrode of the third transistor is electrically connected to the third node, a first electrode of the third transistor is electrically connected to the first voltage terminal, and a second electrode of the third transistor is electrically connected to the sixth node; a gate electrode of the fourth transistor is electrically connected to the fifth node, a first electrode of the fourth transistor is electrically connected to the sixth node, and a second electrode of the fourth transistor is electrically connected to the first clock signal terminal; a first end of the first capacitor is electrically connected to the sixth node, and a second end of the first capacitor is electrically connected to the fifth node.

Optionally, the fourth control sub-circuit includes a fifth transistor; a gate electrode of the fifth transistor is electrically connected to the fifth node, a first electrode of the fifth transistor is electrically connected to the fifth node, and a second electrode of the fifth transistor is electrically connected to the third control node; the fifth control sub-circuit includes a control transistor; a gate electrode of the control transistor is electrically connected to the first node, a first electrode of the control transistor is electrically connected to the twelfth node, and a second electrode of the control transistor is electrically connected to the third control node.

Optionally, the third node control circuit is respectively connected to the third node, a tenth node, an eighth node, the first voltage terminal and the first clock signal terminal, is configured control to connect the third node and the first voltage terminal under the control of a potential of the tenth node, and control to connect the third node and the first clock signal terminal under the control of an potential of the eighth node; the fourth node control circuit is electrically connected to the fourth node, a second clock signal terminal and a driving input terminal respectively, and is configured to control to connect the fourth node and the driving input terminal under the control of a second clock signal provided by the second clock signal terminal.

Optionally, the third node control circuit includes a sixth transistor and a seventh transistor, and the fourth node control circuit includes an eighth transistor; a gate electrode of the sixth transistor is electrically connected to the tenth node, a first electrode of the sixth transistor is electrically connected to the first voltage terminal, and a second electrode of the sixth transistor is electrically connected to the third node; a gate electrode of the seventh transistor is electrically connected to the eighth node, a first electrode of the seventh transistor is electrically connected to the first clock signal terminal, and a second electrode of the seventh transistor is electrically connected to the third node; a gate electrode of the eighth transistor is electrically connected to the second clock signal terminal, a first electrode of the eighth transistor is electrically connected to the driving input terminal, a second electrode of the eighth transistor is electrically connected to the fourth node.

Optionally, the gating circuit is configured to control to write a gating input signal provided by a gating input terminal into the first node when a potential of an (N−1)th stage of ninth node is the second voltage and a potential of an Nth stage of driving signal is the second voltage.

Optionally, the gating circuit includes a ninth transistor; a gate electrode of the ninth transistor is electrically connected to the gating control terminal, a first electrode of the ninth transistor is electrically connected to the first node, and a second electrode of the ninth transistor is electrically connected to the gating input terminal.

Optionally, the gating control terminal includes a first gating control terminal and a second gating control terminal; the gating circuit includes a ninth transistor and a tenth transistor; a gate electrode of the ninth transistor is electrically connected to the first gating control terminal, a first electrode of the ninth transistor is electrically connected to the first node, and a second electrode of the ninth transistor is electrically connected to a first electrode of the tenth transistor; a gate electrode of the tenth transistor is electrically connected to the second gating control terminal, and a second electrode of the tenth transistor is electrically connected to the gating input terminal; the first gating control terminal is the Nth stage of driving signal output terminal, the second gating control terminal is the (N−1)th stage of ninth node, and both the ninth transistor and the tenth transistor are p-type transistors; or, the first gating control terminal is the (N−1)th stage of ninth node, the second gating control terminal is the Nth stage of driving signal output terminal, and both the ninth transistor and the tenth transistor are p-type transistors; or, the first gating control terminal is the (N−1)th stage of driving signal output terminal, the second gating control terminal is the Nth stage of driving signal output terminal, the ninth transistor is an n-type transistor, and the tenth transistor is a p-type transistor; or, the first gating control terminal is an Nth stage of driving signal output terminal, the second gating control terminal is an (N−1)th stage of driving signal output terminal, the ninth transistor is a p-type transistor, and the tenth transistor is an n-type transistor; or, the first gating control terminal is connected to an inverted signal of the (N−1)th stage of driving signal, the second gating control terminal is the Nth stage of driving signal output terminal, the ninth transistor and the tenth transistor are both p-type transistors; or, the first gating control terminal is the Nth stage of driving signal output terminal, and the second gating control terminal is connected to the inverted signal of the (N−1)th stage of driving signal; the ninth transistor and the tenth transistor are both p-type transistors; or, the first gating control terminal is an (N−1)th stage of driving signal terminal, the second gating control terminal is connected to an inverted signal of the Nth stage of driving signal, and both the ninth transistor and the tenth transistor are both n-type transistors; or, the first gating control terminal is connected to the inverted signal of the Nth stage of driving signal, the second gating control terminal is the (N−1)th stage of driving signal terminal, and the ninth transistor and the tenth transistor are both n-type transistors.

Optionally, the output control circuit includes an eleventh transistor; a gate electrode of the eleventh transistor is electrically connected to the first node, a first electrode of the eleventh transistor is electrically connected to the first control node, and a second electrode of the eleventh transistor is electrically connected to the second node.

Optionally, the voltage control circuit includes a second capacitor; a first end of the first capacitor is electrically connected to the first node, and a second end of the first capacitor is electrically connected to the second node.

Optionally, the driving circuit further includes a second node control circuit; wherein the second node control circuit is electrically connected to the third control node, the second node and the first voltage terminal respectively, and is configured to control to connect the second node and the first voltage terminal under the control of the potential of the third control node.

Optionally, the second node control circuit includes a twelfth transistor; a gate electrode of the twelfth transistor is electrically connected to the third control node, a first electrode of the twelfth transistor is electrically connected to the second node, and a second electrode of the twelfth transistor is electrically connected to the first voltage terminal.

Optionally, the output circuit includes a thirteenth transistor, a fourteenth transistor and a third capacitor; a gate electrode of the thirteenth transistor is electrically connected to the second node, a first electrode of the thirteenth transistor is electrically connected to the first voltage terminal, and a second electrode of the thirteenth transistor is electrically connected to the output driving terminal; a gate electrode of the fourteenth transistor is electrically connected to the third control node, a first electrode of the fourteenth transistor is electrically connected to the output driving terminal, and a second electrode of the fourteenth transistor is electrically connected to the second voltage terminal; a first end of the third capacitor is electrically connected to the second node, and a second end of the third capacitor is electrically connected to the first voltage terminal.

Optionally, the driving circuit further includes an initialization circuit; wherein the initialization circuit is electrically connected to an initial control terminal, the second voltage terminal and the first node respectively, and is configured to control to connect the first node and the second voltage terminal under the control of an initial control signal provided by the initial control terminal.

Optionally, the initialization circuit includes a fifteenth transistor; a gate electrode of the fifteenth transistor is electrically connected to the initial control terminal, a first electrode of the fifteenth transistor is electrically connected to the first node, and a second electrode of the fifteenth transistor is electrically connected to the second voltage terminal.

Optionally, the driving signal generation circuit includes a first driving output circuit, a second driving output circuit, a first control node control circuit and a second control node control circuit; the first control node control circuit is configured to control the potential of the first control node; the second control node control circuit is configured to control the potential of the second control node; the first driving output circuit is electrically connected to the first control node, the first voltage terminal and the Nth stage of driving signal output terminal respectively, and is configured to control to connect the Nth stage of driving signal output terminal and the first voltage terminal under the control of the potential of the first control node; the second driving output circuit is electrically connected to the second control node, the second voltage terminal and the Nth stage of driving signal output terminal respectively, and is configured to control to connect the Nth stage of driving signal output terminal and the second voltage terminal under the control of the potential of the second control node.

Optionally, the first control node control circuit includes a tenth node control circuit, an eleventh node control circuit, a ninth node control circuit and a first control circuit; the tenth node control circuit is electrically connected to the tenth node, the second voltage terminal, the second clock signal terminal and the twelfth node respectively, is configured to control to connect the tenth node and the second voltage terminal under the control of the second clock signal provided by the second clock signal terminal, and control to connect the tenth node and the second clock signal terminal under the control of the potential of the twelfth node; the eleventh node control circuit is electrically connected to the second voltage terminal, the tenth node and the eleventh node respectively, and is configured to control to connect the tenth node and the eleventh node under the control of the second voltage signal provided by the second voltage terminal; the ninth node control circuit is electrically connected to the eleventh node, the first clock signal terminal and the ninth node respectively, and is configured to control to connect the ninth node and the first clock signal terminal under the control of the potential of the eleventh node, and control the potential of the ninth node according to the potential of the eleventh node; the first control circuit is electrically connected to the first clock signal terminal, the ninth node, the first control node, the twelfth node and the first voltage terminal respectively, and is configured to control to connect the ninth node and the first control node under the control of the first clock signal provided by the first clock signal terminal, and control to connect the first control node and the first voltage terminal under the control of the potential of the twelfth node.

Optionally, the second control node control circuit includes an eighth node control circuit, a twelfth node control circuit and a second control circuit; the eighth node control circuit is electrically connected to the second voltage terminal, the fourth node, the eighth node and the third node respectively, and is configured to control to connect the fourth node and the eighth node under the control of the second voltage signal provided by the second voltage terminal, and control the potential of the eighth node according to the potential of the third node; the twelfth node control circuit is electrically connected to the (N−1)th stage of driving signal output terminal, the second clock signal end, the twelfth node, the initial control terminal and the first voltage terminal, and is configured to control to connect the twelfth node and the (N−1)th stage of driving signal output terminal under the control of the second clock signal provided by the second clock signal terminal, and control to connect the twelfth node and the first voltage terminal under the control of the initial control signal provided by the initial control terminal; the second control circuit is electrically connected to the second voltage terminal, the twelfth node, the fourth node and the second control node respectively, and is configured to control to connect the twelfth node and the second control node under the control of the second voltage signal provided by the second voltage terminal, and control the potential of the second control node according to the potential of the fourth node.

Optionally, the tenth node control circuit includes a sixteenth transistor and a seventeenth transistor, the eleventh node control circuit includes an eighteenth transistor, and the ninth node control circuit includes a nineteenth transistor and a fourth capacitor, the first control circuit includes a twentieth transistor and a twenty-first transistor; a gate electrode of the sixteenth transistor is electrically connected to the second clock signal terminal, a first electrode of the sixteenth transistor is electrically connected to the second voltage terminal, and a second electrode of the sixteenth transistor is electrically connected to the tenth node; a gate electrode of the seventeenth transistor is electrically connected to the twelfth node, a first electrode of the seventeenth transistor is electrically connected to the tenth node, and a second electrode of the seventeenth transistor is electrically connected to the second clock signal terminal; a gate electrode of the eighteenth transistor is electrically connected to the second voltage terminal, a first electrode of the eighteenth transistor is electrically connected to the tenth node, and a second electrode of the eighteenth transistor is electrically connected to the eleventh node; a gate electrode of the nineteenth transistor is electrically connected to the eleventh node, a first electrode of the nineteenth transistor is electrically connected to the first clock signal terminal, and a second electrode of the nineteenth transistor is electrically connected to the ninth node; a first end of the fourth capacitor is electrically connected to the eleventh node, and a second end of the fourth capacitor is electrically connected to the ninth node; a gate electrode of the twentieth transistor is electrically connected to the first clock signal terminal, a first electrode of the twentieth transistor is electrically connected to the ninth node, and a second electrode of the twentieth transistor is electrically connected to the first control node; a gate electrode of the twenty-first transistor is electrically connected to the twelfth node, a first electrode of the twenty-first transistor is electrically connected to the first control node, and a second electrode of the twenty-first transistor is electrically connected to the first voltage terminal.

Optionally, the eighth node control circuit includes a twenty-second transistor and a fifth capacitor, the twelfth node control circuit includes a twenty-third transistor and a twenty-fourth transistor, and the second control circuit includes a twenty-fifth transistor and a twenty-sixth transistor; a gate electrode of the twenty-second transistor is electrically connected to the second voltage terminal, a first electrode of the twenty-second transistor is electrically connected to the fourth node, and a second electrode of the twenty-second transistor is electrically connected to the eighth node; a first end of the fifth capacitor is electrically connected to the third node, and a second end of the fifth capacitor is electrically connected to the eighth node; a gate electrode of the twenty-third transistor is electrically connected to the second clock signal terminal, and a first electrode of the twenty-third transistor is electrically connected to the (N−1)th stage of driving signal output terminal; a second electrode of the twenty-third transistor is electrically connected to the twelfth node; a gate electrode of the twenty-fourth transistor is electrically connected to the initial control terminal, a first electrode of the twenty-fourth transistor is electrically connected to the first voltage terminal, and a second electrode of the twenty-fourth transistor is electrically connected to the twelfth node; a gate electrode of the twenty-fifth transistor is electrically connected to the second clock signal terminal, a first electrode of the twenty-fifth transistor is electrically connected to the (N−1)th stage of driving signal output terminal, and a second electrode of the twenty-fifth transistor is electrically connected to the fourth node; a gate electrode of the twenty-sixth transistor and a first electrode of the twenty-sixth transistor are electrically connected to the eighth node, and a second electrode of the twenty-sixth transistor is electrically connected to the second control node.

Optionally, the first driving output circuit includes a twenty-seventh transistor and a sixth capacitor, and the second driving output circuit includes a twenty-eighth transistor and a seventh capacitor; a gate electrode of the twenty-seventh transistor is electrically connected to the first control node, a first electrode of the twenty-seventh transistor is electrically connected to the first voltage terminal, and a second electrode of the twenty-seventh transistor is electrically connected to the Nth stage of driving signal output terminal; a first end of the sixth capacitor is electrically connected to the first control node, and a second end of the sixth capacitor is electrically connected to the first voltage terminal; a gate electrode of the twenty-eighth transistor is electrically connected to the second control node, a first electrode of the twenty-eighth transistor is electrically connected to the Nth stage of driving signal output terminal, and a second electrode of the twenty-eighth transistor is electrically connected to the second voltage terminal; a first end of the seventh capacitor is electrically connected to the Nth stage of driving signal output terminal, and a second end of the seventh capacitor is electrically connected to the second voltage terminal.

In a second aspect, an embodiment of the present disclosure provides a driving method, applied to the driving circuit, includes: when the potential of the first node is the first voltage, controlling, by the third control node control circuit, the potential of the third control node to be the valid voltage, so that the output circuit generates and outputs the invalid Nth stage of output driving signal through the Nth stage of output driving terminal under the control of the potential of the third control node; N is a positive integer.

In a third aspect, an embodiment of the present disclosure provides a driving module, including a plurality of stages of driving circuit; an Nth stage driving circuit is electrically connected to the driving signal output terminal included in an (N−1)th stage of driving circuit; N is a positive integer.

In a fourth aspect, an embodiment of the present disclosure provides a display device, including the driving module.

DETAILED DESCRIPTION

The following will clearly and completely describe the technical solutions in the embodiments of the present disclosure with reference to the accompanying drawings. Obviously, the embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
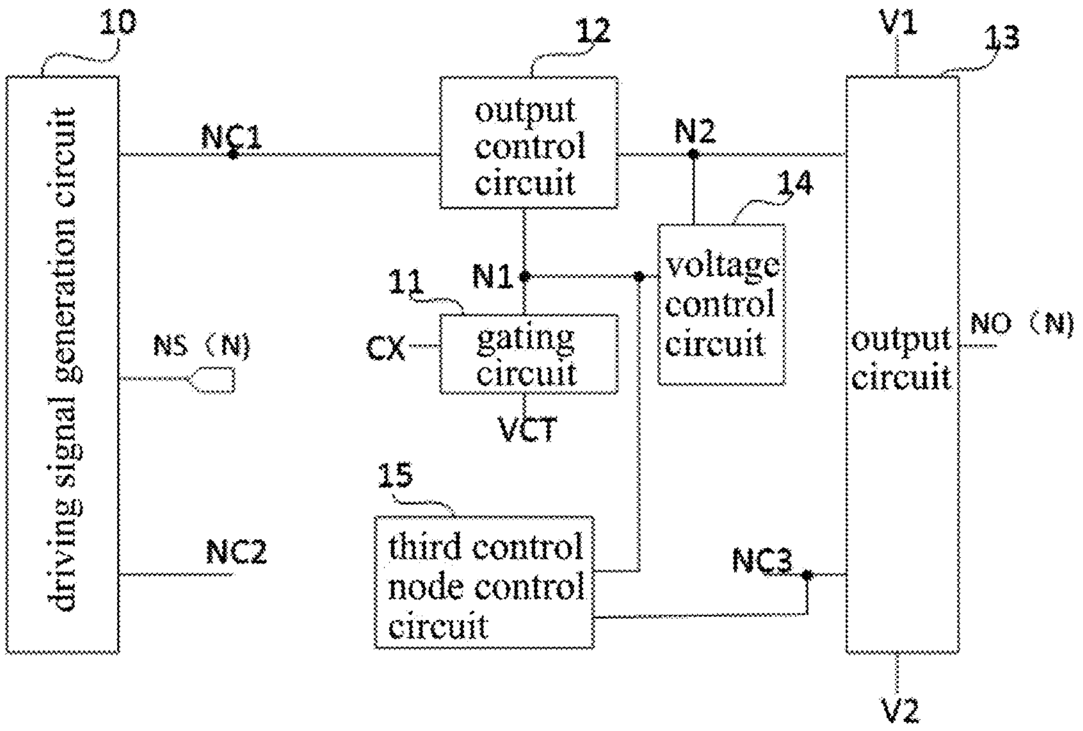
FIG. 1 is a structural diagram of a driving circuit according to at least one embodiment of the present disclosure.

As shown in FIG. 1, the driving circuit according to at least one embodiment of the present disclosure includes a driving signal generation circuit 10, a gating circuit 11, an output control circuit 12, an output circuit 13, a voltage control circuit 14 and a third control node control circuit 15;

The driving signal generation circuit 10 is electrically connected to the first control node NC1, the second control node NC2 and an Nth stage of driving signal output terminal NS (N) respectively, and is configured to generate and output the Nth stage of driving signal through the Nth stage of driving signal output terminal NS (N) under the control of the potential of the first control node NC1 and the potential of the second control node NC2; N is a positive integer;

The gating circuit 11 is electrically connected to a gating control terminal CX, the gating input terminal VCT and the first node N1 respectively, and is configured to control to write the gating input signal provided by the gating input terminal VCT into the first node N1 under the control of the gating control signal provided by the gating control terminal CX;

The output control circuit 12 is electrically connected to the first node N1, the first control node NC1 and the second node N2 respectively, and is configured to control to connect the first control node NC1 and the second node N2 under the control of the potential of the first node N1;

The voltage control circuit 14 is electrically connected to the first node N1 and the second node N2 respectively, and is configured to control the potential of the second node N2 according to the potential of the first node N1;

The output circuit 13 is electrically connected to the second node N2, the third control node NC3, the first voltage terminal V1, the second voltage terminal V2 and the Nth stage of output driving terminal NO (N) respectively, and is configured to control to connect the Nth stage of output driving terminal NO (N) and the first voltage terminal V1 under the control of the potential of the second node N2, and control to connect the Nth stage of output driving terminal NO (N) and the second voltage terminal V2 under the control of the potential of the third control node NC3;

The third control node control circuit 15 is electrically connected to the first node N1 and the third control node NC3 respectively, and is configured to control the potential of the third control node NC3 according to the potential of the first node N1.

Optionally, the first voltage terminal may be a high voltage terminal, and the second voltage terminal may be a low voltage terminal, but is not limited thereto.

In at least one embodiment of the present disclosure, the third control node NC3 and the second control node NC2 may be different nodes, but are not limited to this.

When the driving circuit shown in FIG. 1 of at least one embodiment of the present disclosure is working, When the potential of the first node N1 is the first voltage, the third control node control circuit 15 controls the potential of the third control node NC3 to be a valid voltage, so that the output circuit 13 generates and outputs an invalid Nth stage of output driving signal through the Nth stage of output driving terminal NO (N) under the control of the potential of the third control node NC3;

N is a positive integer.

In at least one embodiment of the present disclosure, the potential of the third control node NC3 is a valid voltage, which means that when the transistor controlled by the third control node NC3 is a p-type transistor, the potential of the third control node NC3 is a low voltage; when the transistor controlled by the third control node NC3 is an n-type transistor, the potential of the third control node NC3 is a high voltage;

An invalid Nth stage of output driving signal refers to: when the transistor controlled by the Nth stage of output driving signal is an n-type transistor, the potential of the Nth stage of output driving signal is a low voltage; when the transistor controlled by the Nth stage of output driving signal is a p-type transistor, the potential of the Nth output driving signal is a high voltage.

In the related art, when the potential of the first node N1 is the first voltage, the third control node NC3 is in a floating state during a part of the time period, so that the output circuit 13 cannot be accurately controlled by the potential of the third control node to generate and output an invalid Nth stage of output driving signal through the Nth stage of output driving terminal NO (N), which will affect the display. Based on this, at least one embodiment of the present disclosure adopts a third control node control circuit to ensure that when the potential of the first node N1 is the first voltage, the Nth stage of output driving terminal NO (N) outputs an invalid Nth stage of output driving signal, to control the transistor in the pixel circuit whose gate electrode is connected to the Nth stage of output driving signal to turn off, so that the pixel circuit does not write data voltage and does not refresh the display screen.

At least one embodiment of the driving circuit shown in FIG. 1 of the present disclosure may be an Nth stage of driving circuit.

When at least one embodiment of the driving circuit shown in FIG. 1 of the present disclosure is working, within one frame of time, Before the Nth stage of driving signal supply phase, the gating circuit 11 writes the gating input signal provided by the gating input terminal VCT into the first node N1 under the control of the gating control signal;

When the gating input signal is a high-voltage signal, in the Nth stage of driving signal supply phase, the Nth stage of driving signal output terminal NS (N) outputs a high-voltage signal, and the potential of the first node N1 is a high voltage, and the output control circuit 12 controls to disconnect the first control node NC1 from the second node N2 under the control of the potential of the first node N1, and the voltage control circuit 14 controls the potential of the second node N2 to be a high voltage according to the potential of the first node N1, and the output circuit controls the output driving terminal NO (N) to maintain output of a low voltage signal, which can control the corresponding row pixel circuit not to update the pixel voltage;

When the gating input signal is a low-voltage signal, in the Nth stage of driving signal supply phase, the Nth stage of driving signal output terminal NS (N) outputs a high-voltage signal, and the potential of the first node N1 is a low voltage, the output control circuit 12 controls to connect the first control node NC1 and the second node N2 under the control of the potential of the first node N1, so that the potential of the second node N2 is a low voltage. The output circuit 13 controls to connect the output driving terminal NO (N) and the first voltage terminal V1 under the control of the potential of the second node N2, so that NO (N) outputs a high voltage signal, and the corresponding row of pixel circuits are controlled to update the pixel voltage.

Embodiments of the present disclosure can realize the update of the partial picture of the display screen by controlling the gating input signal provided by the gating input terminal VCT, thereby reducing the power consumption, or realize ultra-low power consumption of OLED display products such as wearable products, mobile terminals, notebook (NB) through the partial update of the display screen.

Figure 2:
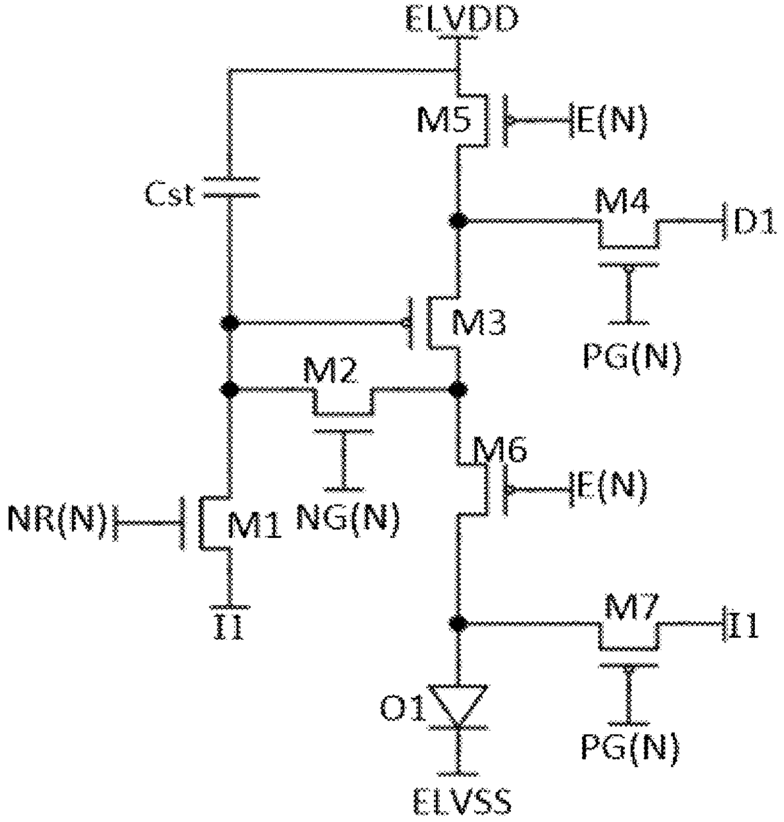
FIG. 2 is a circuit diagram of the relevant pixel circuit.

As shown in FIG. 2, the relevant pixel circuit may include a first display control transistor M1, a second display control transistor M2, a driving transistor M3, a fourth display control transistor M4, a fifth display control transistor M5, and a sixth display control transistor M6, a seventh display control transistor M7, a storage capacitor Cst and an organic light-emitting diode O1;

The gate electrode of M1 is electrically connected to the first reset terminal NR (N), the source electrode of M1 is electrically connected to the initial voltage terminal I1, and the drain electrode of M1 is electrically connected to the gate electrode of M3;

The gate electrode of M2 is electrically connected to the first scanning terminal NG (N), the source electrode of M2 is electrically connected to the gate electrode of M3, and the drain electrode of M2 is electrically connected to the drain electrode of M3;

The gate electrode of M4 is electrically connected to the second scanning terminal PG (N), the source electrode of M4 is electrically connected to the data line D1, and the drain electrode of M4 is electrically connected to the source electrode of M3;

The gate electrode of M5 is electrically connected to the light-emitting control terminal E (N), the source electrode of M5 is electrically connected to the power supply voltage terminal ELVDD, and the drain electrode of M5 is electrically connected to the source electrode of M3;

The gate electrode of M6 is electrically connected to the light-emitting control terminal E (N), the source electrode of M6 is electrically connected to the drain electrode of M3, the drain electrode of M6 is electrically connected to the anode of O1; the cathode of O1 is electrically connected to the low-level terminal ELVSS;

The gate electrode of M7 is electrically connected to the second scanning terminal PG (N), the source electrode of M7 is electrically connected to the initial voltage terminal I1, and the drain electrode of M7 is electrically connected to the anode of O1.

In specific implementation, the first reset terminal NR (N) may be the (N−1)th stage of first scanning terminal NG (N), but is not limited to this.

In the related pixel circuit shown in FIGS. 2, M1 and M2 are n-type transistors, M3, M4, M5, M6 and M7 are all p-type transistors. M1 and M2 are IGZO TFTs with small leakage current. M3, M4, M5, M6 and M7 are all LTPS TFTs.

In the related pixel circuit shown in FIGS. 2, M1 and M2 are IGZO TFTs. When using low-frequency display, IGZO TFTs can ensure that Cst can maintain the voltage of the gate electrode of M3 for a long time.

In the related pixel circuit shown in FIG. 2, the second scanning terminal PG (N) is responsible for resetting the voltage of the anode of O1 and writing the data voltage on the data line to the source electrode of the driving transistor. The first scanning terminal NG (N) is responsible for realizing the reset of Cst, extracting Vth (Vth is the threshold voltage of the driving transistor) and writing the data voltage to the gate electrode of the driving transistor.

In specific implementation, the first scanning signal provided by the first scanning terminal NG (N) and the second scanning signal provided by the second scanning terminal PG (N) may be in opposite phases to each other, but are not limited to this.

The driving circuit described in at least one embodiment of the present disclosure can provide the first scanning signal to the first scanning terminal NG (N) through the output driving terminal NO (N), but is not limited to this.

Figure 3:
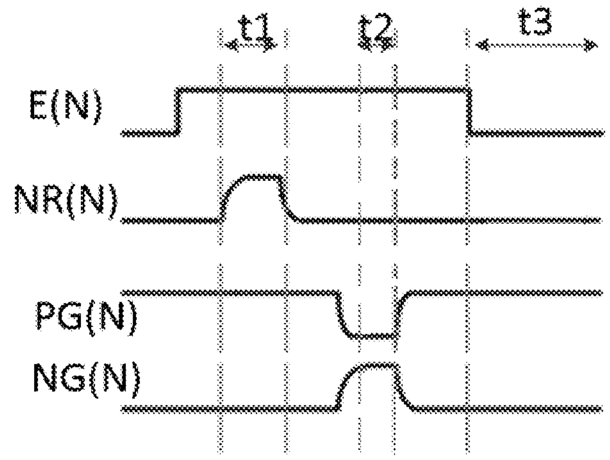
FIG. 3 is a working timing diagram of the relevant pixel circuit shown in FIG. 2.

As shown in FIG. 3, when the relevant pixel circuit shown in FIG. 2 is working, the display period may include a first display control phase t1, a second display control phase t2 and a third display control phase t3 that are set successively;

In the first display control phase t1, E (N) outputs a high voltage signal, NR (N) provides a high voltage signal, PG (N) provides a high voltage signal, NG (N) provides a low voltage signal, M5 and M6 are turned off, M1 is turned on, and the potential of the gate electrode of M3 is pulled down to the initial voltage Vinit; the initial voltage terminal I1 is configured to provide the initial voltage Vinit;

In the second display control phase t2, E (N) outputs a high voltage signal, NR (N) provides a low voltage signal, PG (N) provides a low voltage signal, NG (N) provides a high voltage signal, M5 and M6 are turned off, M1 is turned off, M2 is turned on, M4 is turned on, M2 and M3 form a diode structure, and the data voltage Vdata provided through the data line D1 charges Cst until M3 is turned off. At this time, the gate voltage of M3 is Vdata+Vth, and Vth is the threshold voltage of M3; M7 is turned on to reset the anode voltage of O1;

In the third display control phase t3, E (N) outputs a low voltage signal, NR (N) provides a low voltage signal, PG (N) provides a high voltage signal, NG (N) provides a low voltage signal, M5 and M6 are turned on, and M3 drives O1 to emit light; O1 emits light according to the voltage setting of Vdata.

It can be known from the above related working process of the pixel circuit that NG (N) can control whether the data voltage Vdata (the data voltage Vdata can be the pixel voltage) is written to the gate electrode of M3 in the second display control phase.

Figure 4:
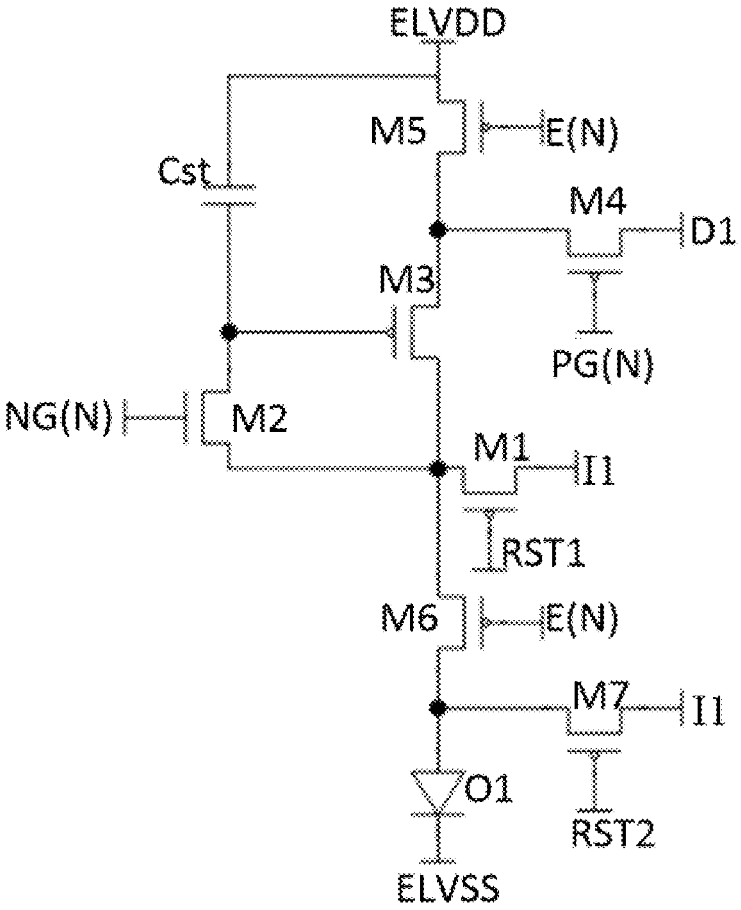
FIG. 4 is a circuit diagram of the relevant pixel circuit.

FIG. 4 is a circuit diagram of a related pixel circuit.

As shown in FIG. 4, the relevant pixel circuit may include a first display control transistor M1, a second display control transistor M2, a driving transistor M3, a fourth display control transistor M4, a fifth display control transistor M5, a sixth display control transistor M6, a seventh display control transistor M7, a storage capacitor Cst and an organic light-emitting diode O1;

The gate electrode of M1 is electrically connected to the third reset terminal RST1, the source electrode of M1 is electrically connected to the initial voltage terminal I1, and the drain electrode of M1 is electrically connected to the drain electrode of M3;

The gate electrode of M2 is electrically connected to the first scanning terminal NG (N), the source electrode of M2 is electrically connected to the gate electrode of M3, and the drain electrode of M2 is electrically connected to the drain electrode of M3;

The gate electrode of M4 is electrically connected to the second scanning terminal PG (N), the source electrode of M4 is electrically connected to the data line D1, and the drain electrode of M4 is electrically connected to the source electrode of M3;

The gate electrode of M5 is electrically connected to the light-emitting control terminal E (N), the source electrode of M5 is electrically connected to the power supply voltage terminal ELVDD, and the drain electrode of M5 is electrically connected to the source electrode of M3;

The gate electrode of M6 is electrically connected to the light-emitting control terminal E (N), the source electrode of M6 is electrically connected to the drain electrode of M3, the drain electrode of M6 is electrically connected to the anode of O1; the cathode of O1 is electrically connected to the low-level terminal ELVSS;

The gate electrode of M7 is electrically connected to the fourth reset terminal RST2, the source electrode of M7 is electrically connected to the initial voltage terminal I1, and the drain electrode of M7 is electrically connected to the anode of O1.

When the relevant pixel circuit shown in FIG. 4 is working, NG (N) can control whether the data voltage Vdata on the data line D1 is written to the gate electrode of the driving transistor M3.

In specific implementation, the first scanning signal provided by NG (N) can be configured to control to turn on the second transistor or turn off the second transistor, to control whether the data voltage on the data line is written to the gate electrode of the driving transistor, thereby controlling whether to update the brightness of the current row of the pixel circuits; when NG (N) outputs a high voltage signal, the second transistor is turned on, and the brightness of the current row of pixel circuits can be updated; when NG (N) outputs a low voltage signal, the second transistor is always turned off, the change of the data voltage on the data line will not be written to the gate electrode of the driving transistor, and the brightness of the organic light-emitting diode will not change, that is, the display brightness of the current row of pixel circuits remains unchanged in the current frame. In summary, it can be seen that the pixel brightness can be refreshed by controlling to turn on or off the N-type transistor. Therefore, when some pixels are prevented from being refreshed, it is just ensured that the N-type transistor is turned off.

Figure 5:
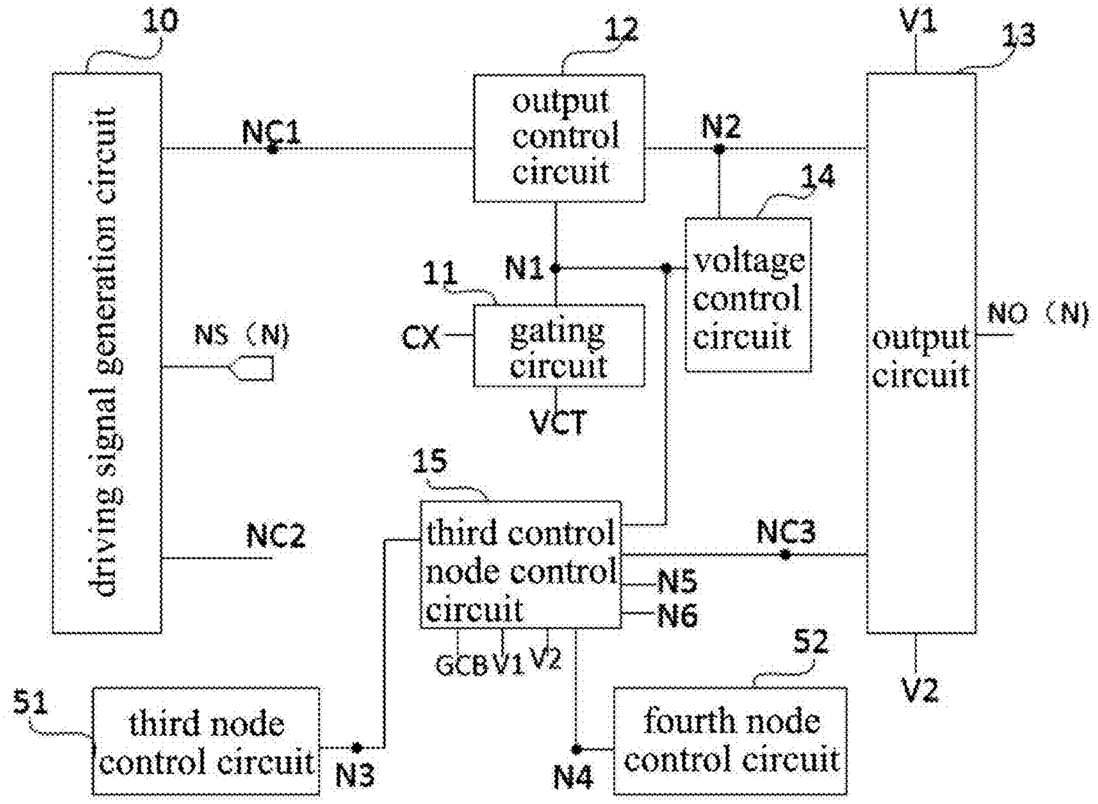
FIG. 5 is a structural diagram of a driving circuit according to at least one embodiment of the present disclosure.

As shown in FIG. 5, based on at least one embodiment of the driving circuit shown in FIG. 1, the driving circuit described in at least one embodiment of the present disclosure also includes a third node control circuit 51 and a fourth node control circuit 52;

The third node control circuit 51 is electrically connected to the third node N3 and is configured to control the potential of the third node N3;

The fourth node control circuit 52 is electrically connected to the fourth node N4 and is configured to control the potential of the fourth node N4;

The third control node control circuit 15 is respectively connected to the third node N3, the first node N1, the fourth node N4, the fifth node N5, the sixth node N6, the third control node NC3, the first voltage terminal V1, the second voltage terminal V2 and the first clock signal terminal GCB, and is configured to control to connect the first node N1 and the second voltage terminal V2 under the control of the potential of the third node N3, and control to connect the fourth node N4 and the fifth node N5 under the control of the potential of the first node N1, and control the potential of the third control node NC3 according to the potential of the fifth node N5, control to connect the sixth node N6 and the first voltage terminal V1 under the control of the potential of the third node N3, control to connect the sixth node N6 and the first clock signal terminals GCB under the control of the potential of the fifth node N5, and control the potential of the fifth node N5 according to the potential of the sixth node N6.

In at least one embodiment of the present disclosure, the third control node control circuit includes a first control sub-circuit, a second control sub-circuit, a third control sub-circuit and a fourth control sub-circuit;

The first control sub-circuit is electrically connected to the third node, the first node and the second voltage terminal respectively, and is configured to control to connect the first node and the second voltage terminal under the control of the potential of the third node;

The second control sub-circuit is electrically connected to the first node, the fourth node and the fifth node respectively, and is configured to control to connect the fourth node and the fifth node under the control of the potential of the first node;

The third control sub-circuit is electrically connected to the third node, the first voltage terminal, the sixth node and the first clock signal terminal respectively, and is configured to control to connect the sixth node and the first voltage terminal under the control of the potential of the third node, and control to connect the sixth node and the first clock signal terminal under the control of the potential of the fifth node, and control the potential of the fifth node according to the potential of the sixth node;

The fourth control sub-circuit is electrically connected to the third control node and the fifth node respectively, and is configured to control the potential of the third control node according to the potential of the fifth node.

In specific implementation, the third control node control circuit may include a first control sub-circuit, a second control sub-circuit, a third control sub-circuit and a fourth control sub-circuit; the first control sub-circuit is configured to control to connect the first node and the second voltage terminal under the control of the potential of the third node; the second control sub-circuit controls to connect the fourth node and the fifth node under the control of the potential of the first node; the third control sub-circuit controls to connect the sixth node and the first voltage terminal under the control of the potential of the third node, and control to connect the sixth node and the first clock signal terminal under the control of the potential of the fifth node, and control the potential of the fifth node according to the potential of the sixth node, the fourth control sub-circuit controls the potential of the third control node according to the potential of the fifth node.

Figure 6:
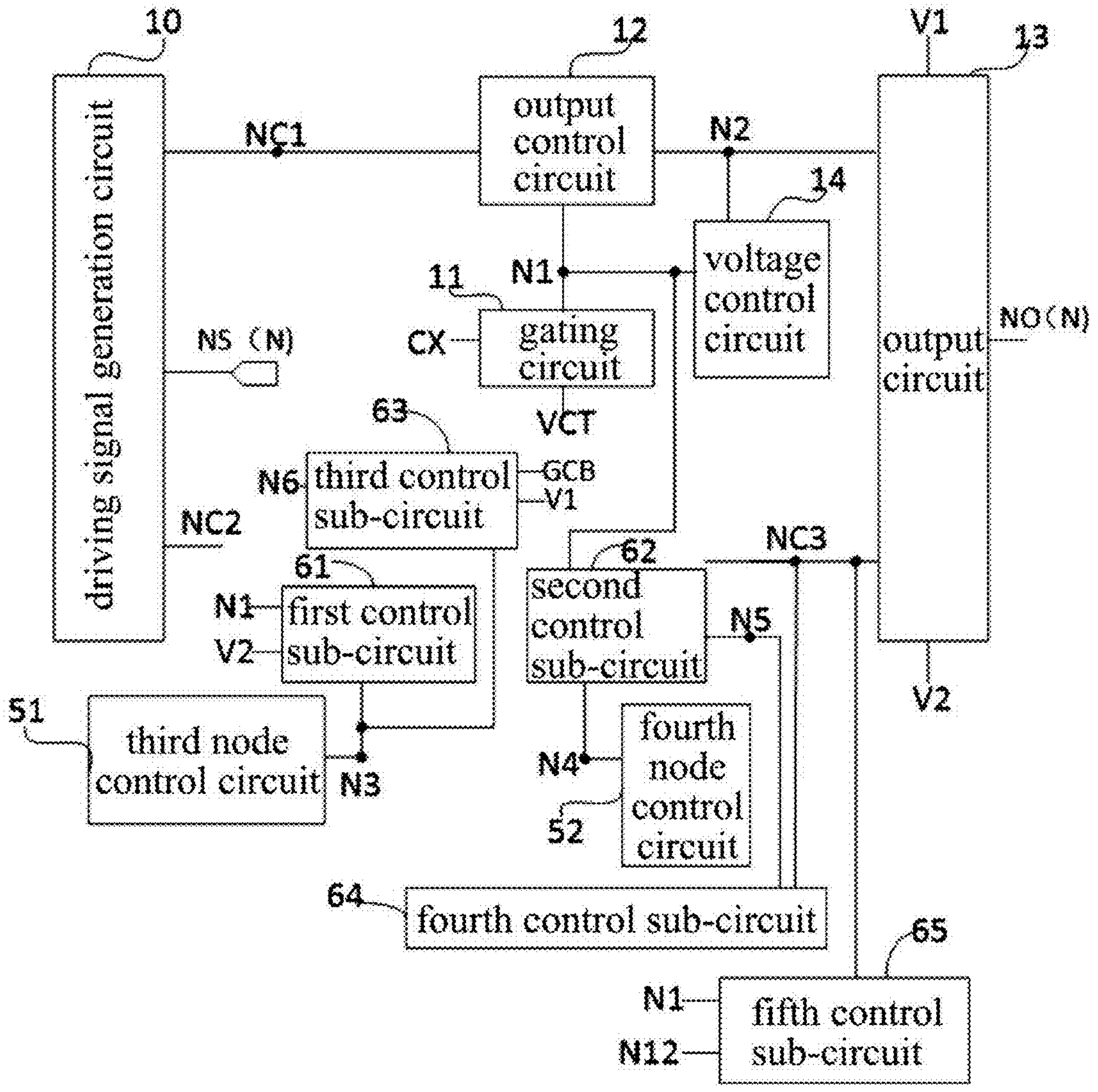
FIG. 6 is a structural diagram of a driving circuit according to at least one embodiment of the present disclosure.

As shown in FIG. 6, based on at least one embodiment of the driving circuit shown in FIG. 5, the third control node control circuit includes a first control sub-circuit 61, a second control sub-circuit 62, a third control sub-circuit 63, a fourth control sub-circuit 64 and a fifth control sub-circuit 65;

The first control sub-circuit 61 is electrically connected to the third node N3, the first node N1 and the second voltage terminal V2 respectively, and is configured to control to connect the first node N1 and the second voltage terminal V2 under the control of the potential of the third node N3;

The second control sub-circuit 62 is electrically connected to the first node N1, the fourth node N4 and the fifth node N5 respectively, and is configured to control to connect the fourth node N4 and the fifth node N5 under the control of the potential of the first node N1;

The third control sub-circuit 63 is electrically connected to the third node N3, the first voltage terminal V1, the sixth node N6 and the first clock signal terminal GCB respectively, and is configured to control to connect the sixth node N6 and the first voltage terminal V1 under the control of the potential of the third node N3, and control to connect the sixth node N6 and the first clock signal terminal GCB under the control of the potential of the fifth node N5, control the potential of the fifth node N5 according to the potential of the sixth node N6;

The fourth control sub-circuit 64 is electrically connected to the third control node NC3 and the fifth node N5 respectively, and is configured to control the potential of the third control node NC3 according to the potential of the fifth node N5;

The fifth control sub-circuit 65 is electrically connected to the first node N1, the twelfth node N12 and the third control node NC3 respectively, and is configured to control to connect the twelfth transistor N12 and the third control node NC3 under the control of the potential of the first node N1.

Optionally, the first control sub-circuit includes a first transistor, and the second control sub-circuit includes a second transistor;

a gate electrode of the first transistor is electrically connected to the third node, a first electrode of the first transistor is electrically connected to the second voltage terminal, and a second electrode of the first transistor is electrically connected to the first node;

a gate electrode of the second transistor is electrically connected to the first node, a first electrode of the second transistor is electrically connected to the fourth node, and a second electrode of the second transistor is electrically connected to the fifth node.

Optionally, the third control sub-circuit includes a third transistor, a fourth transistor and a first capacitor;

a gate electrode of the third transistor is electrically connected to the third node, a first electrode of the third transistor is electrically connected to the first voltage terminal, and a second electrode of the third transistor is electrically connected to the sixth node;

a gate electrode of the fourth transistor is electrically connected to the fifth node, a first electrode of the fourth transistor is electrically connected to the sixth node, and a second electrode of the fourth transistor is electrically connected to the first clock signal terminal;

A first end of the first capacitor is electrically connected to the sixth node, and a second end of the first capacitor is electrically connected to the fifth node.

Optionally, the fourth control sub-circuit includes a fifth transistor;

a gate electrode of the fifth transistor is electrically connected to the fifth node, a first electrode of the fifth transistor is electrically connected to the fifth node, and a second electrode of the fifth transistor is electrically connected to the third control node;

The fifth control sub-circuit includes a control transistor;

a gate electrode of the control transistor is electrically connected to the first node, a first electrode of the control transistor is electrically connected to the twelfth node, and a second electrode of the control transistor is electrically connected to the third control node.

In at least one embodiment of the present disclosure, the third node control circuit is respectively connected to the third node, the tenth node, the eighth node, the first voltage terminal and the first clock signal terminal, is configured control to connect the third node and the first voltage terminal under the control of the potential of the tenth node, and control to connect the third node and the first clock signal terminal under the control of the potential of the eighth node;

The fourth node control circuit is electrically connected to the fourth node, the second clock signal terminal and the driving input terminal respectively, and is configured to control to connect the fourth node and the driving input terminal under the control of the second clock signal provided by the second clock signal terminal.

Optionally, the driving input terminal may be an (N−1)th stage of driving signal output terminal.

Optionally, the third node control circuit includes a sixth transistor and a seventh transistor, and the fourth node control circuit includes an eighth transistor;

a gate electrode of the sixth transistor is electrically connected to the tenth node, a first electrode of the sixth transistor is electrically connected to the first voltage terminal, and a second electrode of the sixth transistor is electrically connected to the third node;

a gate electrode of the seventh transistor is electrically connected to the eighth node, a first electrode of the seventh transistor is electrically connected to the first clock signal terminal, and a second electrode of the seventh transistor is electrically connected to the third node;

a gate electrode of the eighth transistor is electrically connected to the second clock signal terminal, a first electrode of the eighth transistor is electrically connected to the driving input terminal, a the second electrode of the eighth transistor is electrically connected to the fourth node.

In at least one embodiment of the present disclosure, the gating circuit is configured to control to write the gating input signal provided by the gating input terminal into the first node when the potential of the (N−1)th stage of the ninth node is the second voltage and the potential of the Nth stage of driving signal is the second voltage.

Optionally, the second voltage may be a low voltage, but is not limited thereto.

Optionally, the gating circuit includes a ninth transistor;

a gate electrode of the ninth transistor is electrically connected to the gating control terminal, a first electrode of the ninth transistor is electrically connected to the first node, and a second electrode of the ninth transistor is electrically connected to the gating input terminal.

Figure 7:
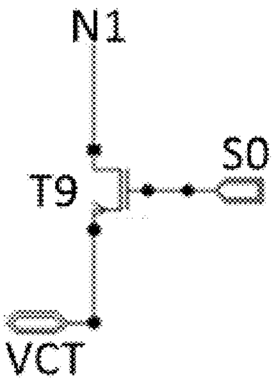
FIG. 7 is a circuit diagram of the gating circuit in the driving circuit according to an embodiment of the present disclosure.

As shown in FIG. 7, the gating circuit may include a ninth transistor T9;

The gate electrode of the ninth transistor T9 is electrically connected to the gating control terminal S0, the drain electrode of the ninth transistor T9 is electrically connected to the first node N1, and the source electrode of the ninth transistor T9 is connected to the gating input terminal VCT;

T9 is a p-type transistor.

Figure 8:
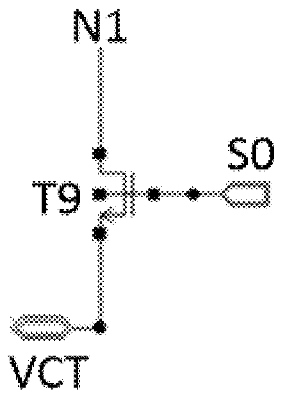
FIG. 8 is a circuit diagram of the gating circuit in the driving circuit according to an embodiment of the present disclosure.

As shown in FIG. 8, the gating circuit may include a ninth transistor T9;

The gate electrode of the ninth transistor T9 is electrically connected to the gating control terminal S0, the source electrode of the ninth transistor T9 is electrically connected to the first node N1, and the drain electrode of the ninth transistor T9 is connected to the gating input terminal VCT;

T9 is an n-type transistor.

Optionally, the gating control terminal includes a first gating control terminal and a second gating control terminal; the gating circuit includes a ninth transistor and a tenth transistor;

a gate electrode of the ninth transistor is electrically connected to the first gating control terminal, a first electrode of the ninth transistor is electrically connected to the first node, and a second electrode of the ninth transistor is electrically connected to a first electrode of the tenth transistor;

a gate electrode of the tenth transistor is electrically connected to the second gating control terminal, and a second electrode of the tenth transistor is electrically connected to the gating input terminal;

The first gating control terminal is the Nth stage of driving signal output terminal, the second gating control terminal is the (N−1)th stage of ninth node, and both the ninth transistor and the tenth transistor are p-type transistors; or, The first gating control terminal is the (N−1)th stage of ninth node, the second gating control terminal is the Nth stage of driving signal output terminal, and both the ninth transistor and the tenth transistor are p-type transistors; or, The first gating control terminal is an (N−1)th stage of driving signal output terminal, the second gating control terminal is an Nth stage of driving signal output terminal, the ninth transistor is an n-type transistor, and the tenth transistor is a p-type transistor; or, The first gating control terminal is an Nth stage of driving signal output terminal, the second gating control terminal is an (N−1)th stage of driving signal output terminal, the ninth transistor is a p-type transistor, and the tenth transistor is an n-type transistor; or, The first gating control terminal is connected to the inverted signal of the (N−1)th stage of driving signal, the second gating control terminal is the Nth stage of driving signal output terminal, the ninth transistor and the tenth transistor are both p-type transistors; or, The first gating control terminal is the Nth stage of driving signal output terminal, and the second gating control terminal is connected to the inverted signal of the (N−1)th stage of driving signal; the ninth transistor and the tenth transistor are both p-type transistors; or, The first gating control terminal is an (N−1)th stage of driving signal terminal, the second gating control terminal is connected to the inverted signal of the Nth stage of driving signal, and both the ninth transistor and the tenth transistor are both n-type transistors; or, The first gating control terminal is connected to the inverted signal of the Nth stage of driving signal, the second gating control terminal is the (N−1)th stage of driving signal terminal, and the ninth transistor and the tenth transistor are both n-type transistors.

Figure 9:
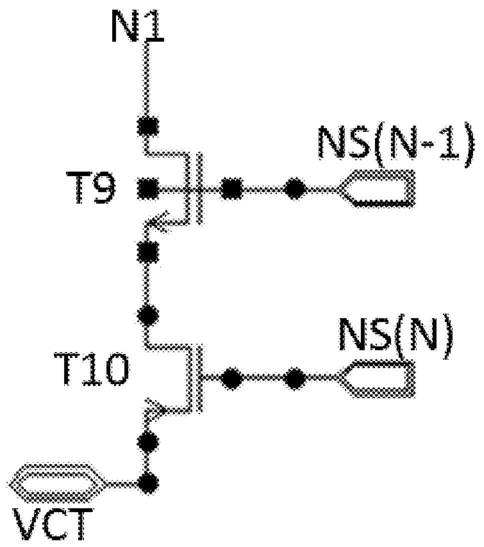
FIG. 9 is a circuit diagram of the gating circuit in the driving circuit according to an embodiment of the present disclosure.

As shown in FIG. 9, the gating circuit may include a ninth transistor T9 and a tenth transistor T10;

The gate electrode of the ninth transistor T9 is electrically connected to the (N−1)th stage of driving signal output terminal NS (N−1), the source electrode of the ninth transistor T9 is electrically connected to the first node N1, and the drain electrode of the ninth transistor T9 is electrically connected to the drain electrode of the tenth transistor T10;

The gate electrode of the tenth transistor T10 is electrically connected to the Nth stage of driving signal output terminal NS (N), and the source electrode of the tenth transistor T10 is electrically connected to the gating input terminal VCT; T9 is an n-type transistor, and T10 is a p-type transistor.

Figure 10:
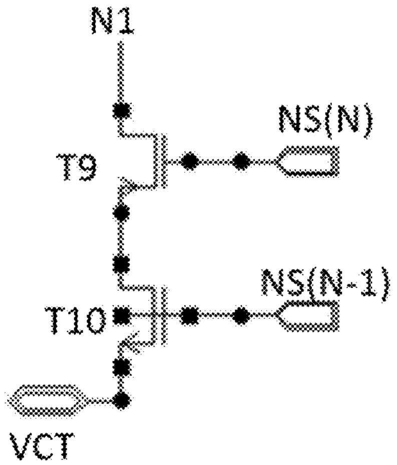
FIG. 10 is a circuit diagram of the gating circuit in the driving circuit according to an embodiment of the present disclosure.

As shown in FIG. 10, the gating circuit may include a ninth transistor T9 and a tenth transistor T10;

The gate electrode of the ninth transistor T9 is electrically connected to the Nth stage of driving signal output terminal NS (N), the drain electrode of the ninth transistor T9 is electrically connected to the first node N1, and the source electrode of the ninth transistor T9 is electrically connected to the source electrode of the tenth transistor T10;

The gate electrode of the tenth transistor T10 is electrically connected to the (N−1)th stage of driving signal output terminal NS (N−1), and the drain electrode of the tenth transistor T10 is electrically connected to the gating input terminal VCT;

T9 is a p-type transistor and T10 is an n-type transistor.

Figure 11:
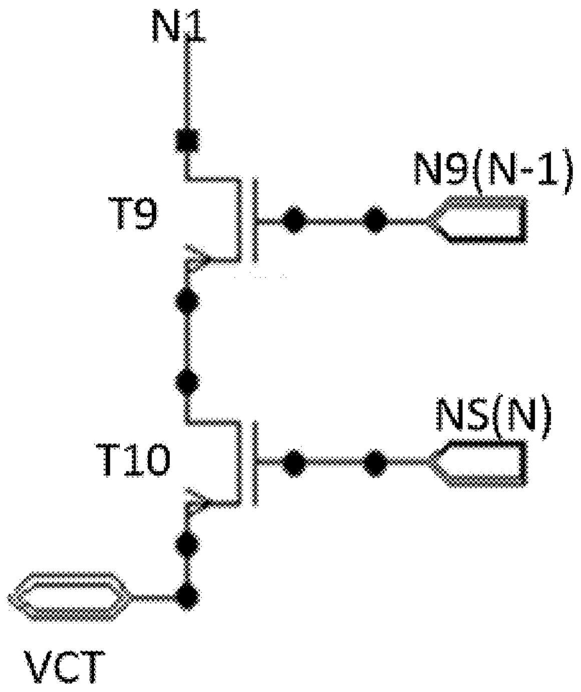
FIG. 11 is a circuit diagram of the gating circuit in the driving circuit according to an embodiment of the present disclosure.

As shown in FIG. 11, the gating circuit may include a ninth transistor T9 and a tenth transistor T10;

The gate electrode of the ninth transistor T9 is electrically connected to the (N−1)th stage of the ninth node N9 (N−1), and the drain electrode of the ninth transistor T9 is electrically connected to the first node N1, the source electrode of the ninth transistor T9 is electrically connected to the drain electrode of the tenth transistor T10;

The gate electrode of the tenth transistor T10 is electrically connected to the Nth stage of driving signal output terminal NS (N), and the source electrode of the tenth transistor T10 is electrically connected to the gating input terminal VCT;

T9 is a p-type transistor, and T10 is a p-type transistor.

In at least one embodiment of the present disclosure, the (N−1)th stage of the ninth node N9 (N−1) may be the ninth node in the (N−1)th stage of driving circuit.

Figure 12:
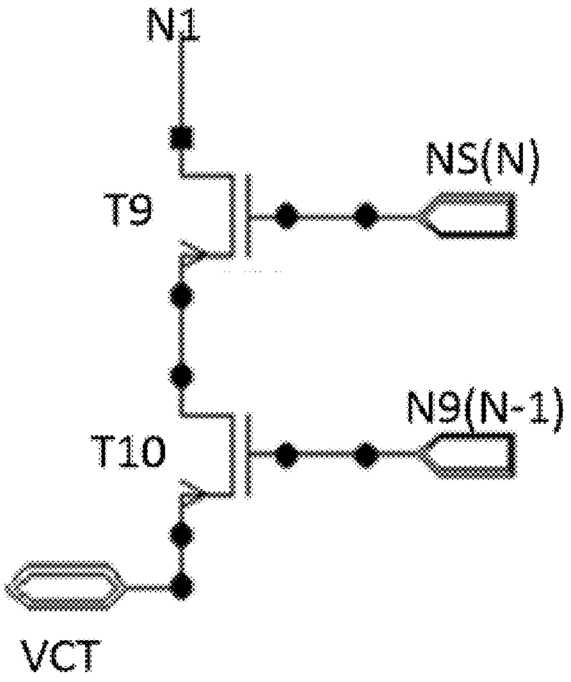
FIG. 12 is a circuit diagram of the gating circuit in the driving circuit according to an embodiment of the present disclosure.

As shown in FIG. 12, the gating circuit may include a ninth transistor T9 and a tenth transistor T10;

The gate electrode of the ninth transistor T9 is electrically connected to the Nth stage of driving signal output terminal NS (N), the drain electrode of the ninth transistor T9 is electrically connected to the first node N1, and the source electrode of the ninth transistor T9 is electrically connected to the drain electrode of the tenth transistor T10;

The gate electrode of the tenth transistor T10 is electrically connected to the (N−1)th stage of the ninth node N9 (N−1), and the source electrode of the tenth transistor T10 is electrically connected to the gating input terminal VCT;

T9 is a p-type transistor, and T10 is a p-type transistor.

Figure 13:
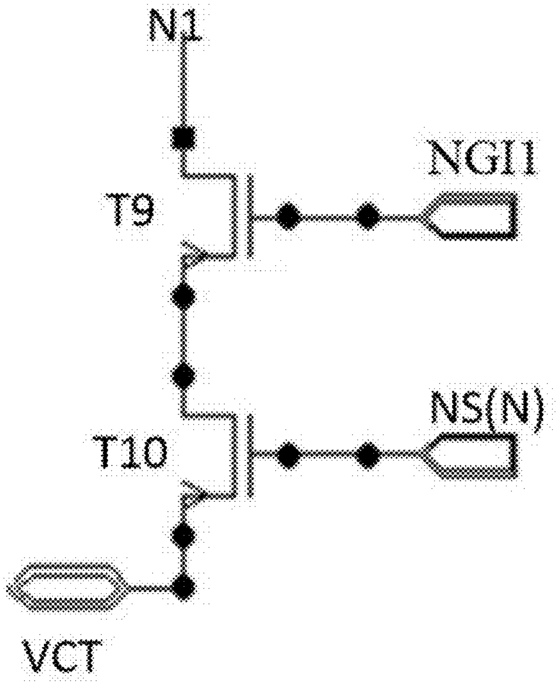
FIG. 13 is a circuit diagram of the gating circuit in the driving circuit according to an embodiment of the present disclosure.

As shown in FIG. 13, the gating circuit may include a ninth transistor T9 and a tenth transistor T10;

The gate electrode of the ninth transistor T9 is electrically connected to the first inversion driving signal terminal NGI1, the drain electrode of the ninth transistor T9 is electrically connected to the first node N1, and the source electrode of the ninth transistor T9 is electrically connected to the drain electrode of the tenth transistor T10; the first inversion driving signal provided by the first inversion driving signal terminal NGI1 and the Nth stage of driving signal provided by the (N−1) the stage of driving signal output terminal NS (N−1) are inverted in phase;

The gate electrode of the tenth transistor T10 is electrically connected to the Nth stage of driving signal output terminal NS (N), and the source electrode of the tenth transistor T10 is electrically connected to the gating input terminal VCT;

T9 is a p-type transistor, and T10 is a p-type transistor.

Figure 14:
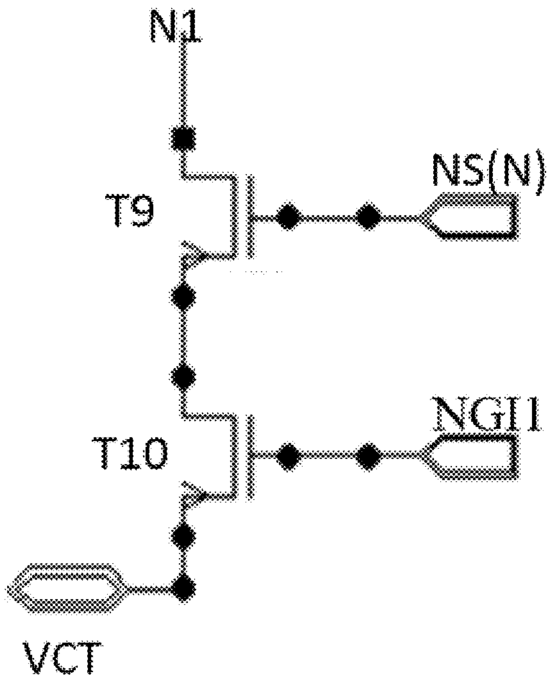
FIG. 14 is a circuit diagram of the gating circuit in the driving circuit according to an embodiment of the present disclosure.

As shown in FIG. 14, the gating circuit may include a ninth transistor T9 and a tenth transistor T10;

The gate electrode of the ninth transistor T9 is electrically connected to the Nth stage of driving signal output terminal NS (N), the drain electrode of the ninth transistor T9 is electrically connected to the first node N1, and the source electrode of the ninth transistor T9 is electrically connected to the drain electrode of the tenth transistor T10;

The gate electrode of the tenth transistor T10 is electrically connected to the first inversion driving signal terminal NGI1, and the source electrode of the tenth transistor T10 is electrically connected to the gating input terminal VCT; the first inversion driving signal provided by the first inversion driving signal terminal NGI1 and the (N−1)th stage of driving signal provided by the (N−1)th stage of driving signal output terminal NS (N−1) are inverted in phase;

T9 is a p-type transistor, and T10 is a p-type transistor.

Figure 15:
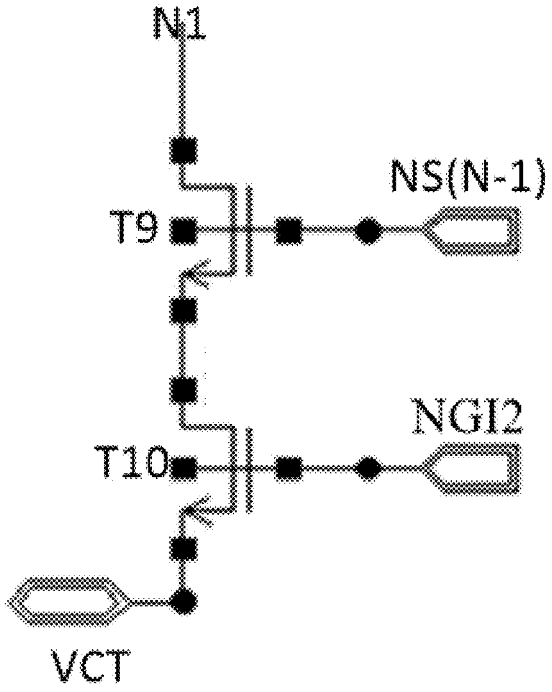
FIG. 15 is a circuit diagram of the gating circuit in the driving circuit according to an embodiment of the present disclosure.

As shown in FIG. 15, the gating circuit may include a ninth transistor T9 and a tenth transistor T10;

The gate electrode of the ninth transistor T9 is electrically connected to the (N−1)th stage of driving signal output terminal NS (N−1), the source electrode of the ninth transistor T9 is electrically connected to the first node N1, and the drain electrode of the ninth transistor T9 is electrically connected to the source electrode of the tenth transistor T10;

The gate electrode of the tenth transistor T10 is electrically connected to the second inversion driving signal terminal NGI2, and the drain electrode of the tenth transistor T10 is electrically connected to the gating input terminal VCT; the second inverted driving signal provided by the second inverted driving signal terminal NGI2 and the Nth stage of driving signal provided by the Nth stage of driving signal output terminal NS (N) are inverted in phase;

T9 is an n-type transistor, and T10 is an n-type transistor.

Figure 16:
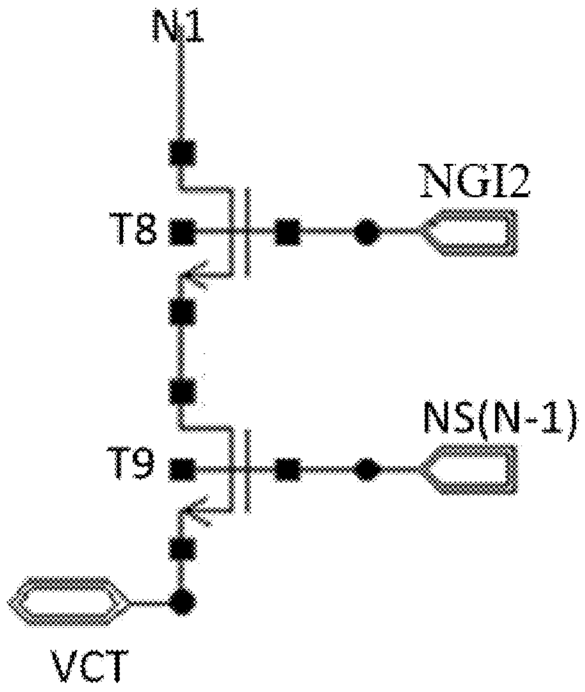
FIG. 16 is a circuit diagram of the gating circuit in the driving circuit according to an embodiment of the present disclosure.

As shown in FIG. 16, the gating circuit may include a ninth transistor T9 and a tenth transistor T10;

The gate electrode of the ninth transistor T9 is electrically connected to the second inversion driving signal terminal NGI2, the source electrode of the ninth transistor T9 is electrically connected to the first node N1, and the drain electrode of the ninth transistor T9 is electrically connected to the source electrode of the tenth transistor T10; the second inversion driving signal provided by the second inversion driving signal terminal NGI2 and the Nth stage of driving signal provided by the Nth stage of driving signal output terminal NS (N) are inverted in phase;

The gate electrode of the tenth transistor T10 is electrically connected to the (N−1)th stage of driving signal output terminal NS (N−1), and the drain electrode of the tenth transistor T10 is electrically connected to the gating input terminal VCT;

T9 is an n-type transistor, and T10 is an n-type transistor.

Figure 17:
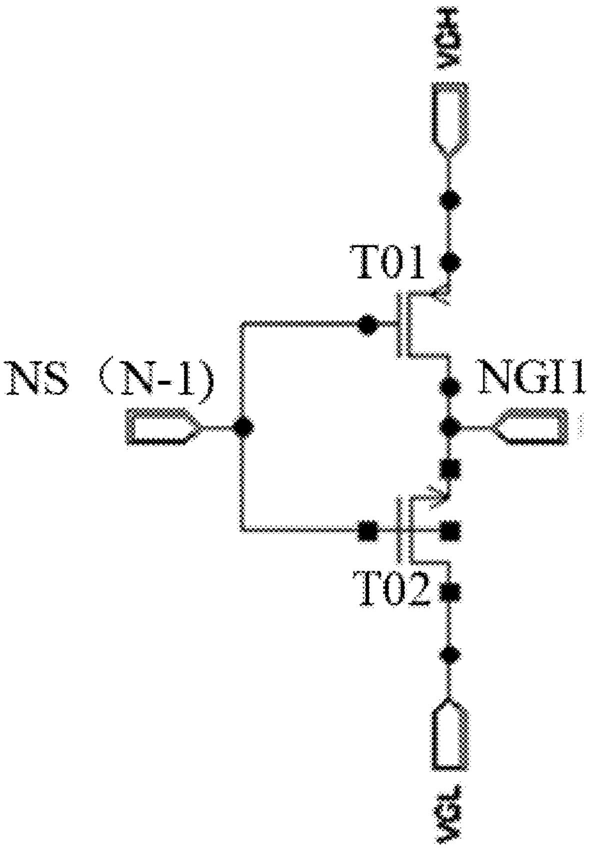
FIG. 17 is a circuit diagram of an inverter according to at least one embodiment of the present disclosure.

As shown in FIG. 17, the (N−1)th stage of driving signal provided by the (N−1)th stage driving signal output terminal NS (N−1) can be inverted through the first inverter to obtain the first inversion driving signal provided by the first inversion driving signal terminal NGI1;

The first inverter includes a first inversion control transistor T01 and a second inversion control transistor T02;

T01 is a p-type transistor, and T02 is an n-type transistor.

Figure 18:
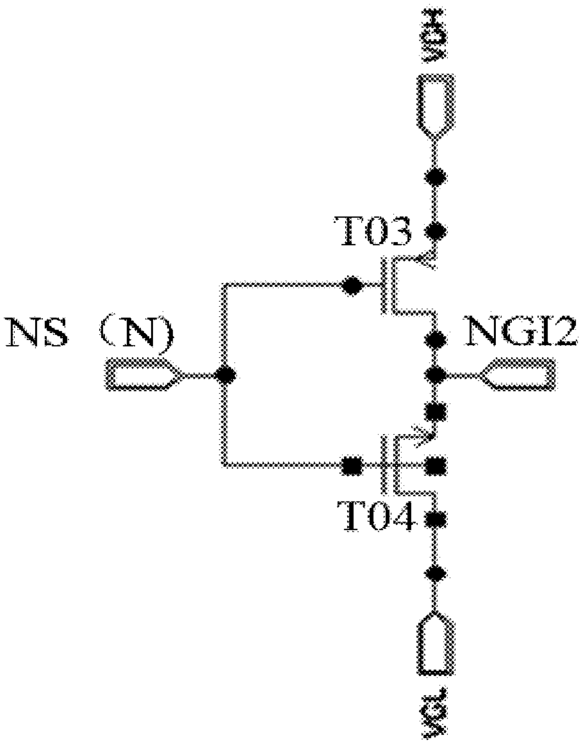
FIG. 18 is a circuit diagram of an inverter according to at least one embodiment of the present disclosure.

As shown in FIG. 18, the Nth stage of driving signal provided by the Nth stage of driving signal output terminal NS (N) can be inverted through the second inverter to obtain the second inversion driving signal provided by the second inversion driving signal terminal NGI2;

The second inverter includes a third inversion control transistor T03 and a fourth inversion control transistor T04;

T03 is a p-type transistor, and T04 is an n-type transistor.

Optionally, the output control circuit includes an eleventh transistor;

- a gate electrode of the eleventh transistor is electrically connected to the first node, a first electrode of the eleventh transistor is electrically connected to the first control node, and a second electrode of the eleventh transistor is electrically connected to the second node.

Optionally, the voltage control circuit includes a first capacitor;

- a first end of the first capacitor is electrically connected to the first node, and a second end of the first capacitor is electrically connected to the second node.

The driving circuit according to at least one embodiment of the present disclosure further includes a second node control circuit;

The second node control circuit is electrically connected to the third control node, the second node and the first voltage terminal respectively, and is configured to control to connect the second node and the first voltage terminal under the control of the potential of the third control node.

Figure 19:
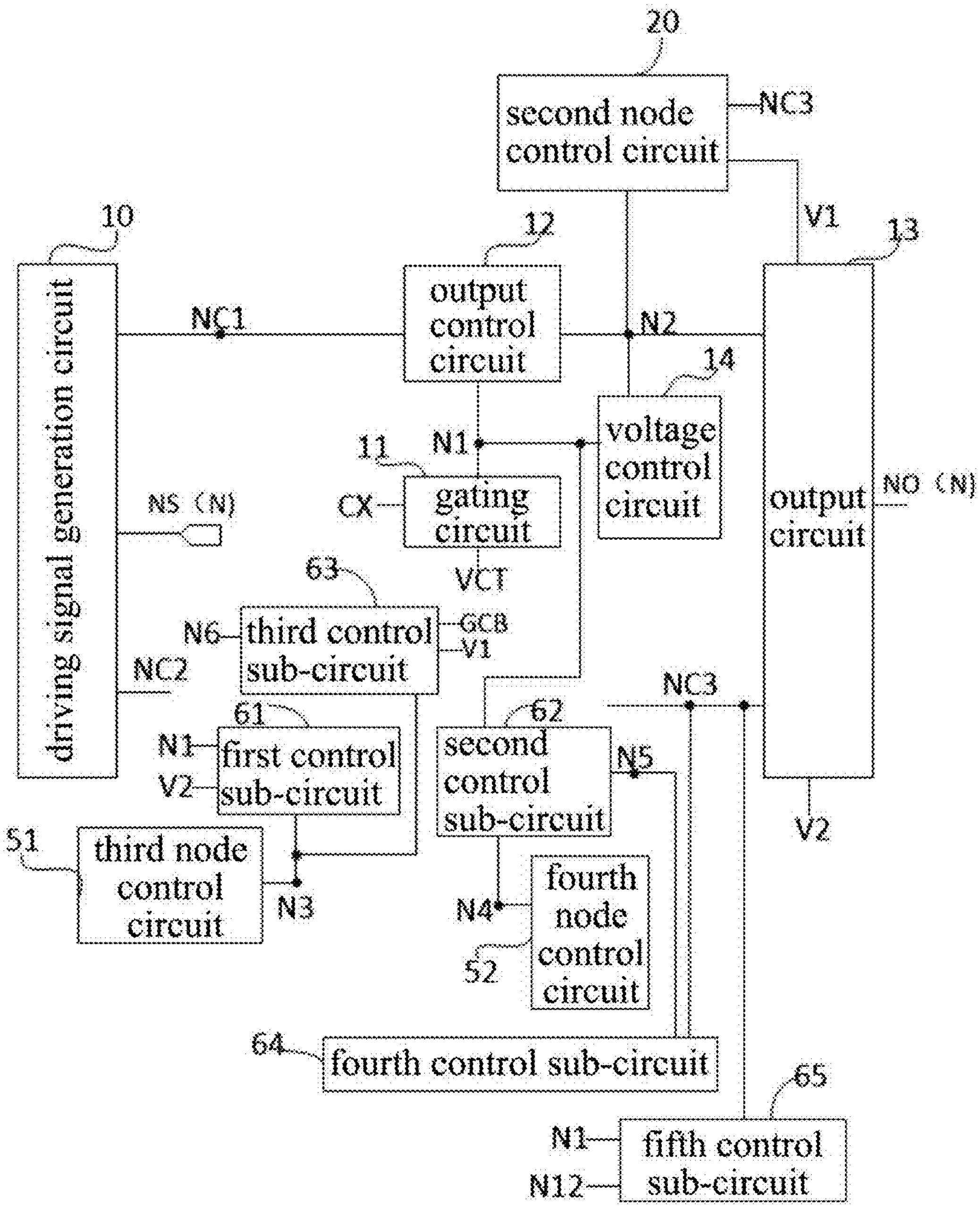
FIG. 19 is a structural diagram of a driving circuit according to at least one embodiment of the present disclosure.

As shown in FIG. 19, based on at least one embodiment of the driving circuit shown in FIG. 6, the driving circuit further includes a second node control circuit 20;

The second node control circuit 20 is electrically connected to the third control node NC3, the second node N2 and the first voltage terminal V1 respectively, and is configured to control to connect the second node N2 and the first voltage terminal V1 under the control of the potential of the third control node NC3.

When at least one embodiment of the driving circuit shown in FIG. 19 is working, when the potential of the third control node NC3 is a valid, the potential of the second node N2 may be the first voltage.

Optionally, the second node control circuit includes a twelfth transistor;

- a gate electrode of the twelfth transistor is electrically connected to the third control node, a first electrode of the twelfth transistor is electrically connected to the second node, and a second electrode of the twelfth transistor is electrically connected to the first voltage terminal.

Optionally, the output circuit includes a thirteenth transistor, a fourteenth transistor and a second capacitor;

a gate electrode of the thirteenth transistor is electrically connected to the second node, a first electrode of the thirteenth transistor is electrically connected to the first voltage terminal, and a second electrode of the thirteenth transistor is electrically connected to the output driving terminal;

a gate electrode of the fourteenth transistor is electrically connected to the third control node, a first electrode of the fourteenth transistor is electrically connected to the output driving terminal, and a second electrode of the fourteenth transistor is electrically connected to the second voltage terminal;

a first end of the second capacitor is electrically connected to the second node, and a second end of the second capacitor is electrically connected to the first voltage terminal.

The driving circuit according to at least one embodiment of the present disclosure further includes an initialization circuit;

The initialization circuit is electrically connected to the initial control terminal, the second voltage terminal and the first node respectively, and is configured to control to connect the first node and the second voltage terminal under the control of the initial control signal provided by the initial control terminal.

In specific implementation, the driving circuit may also include an initialization circuit. When the display device is powered on, the initialization circuit controls to connect the first node and the second voltage terminal under the control of the initial control signal to control the potential of the first node to be the second voltage, and the output control circuit controls to connect the first control node and the second node under the control of the potential of the first node.

In specific implementation, the driving circuit may also include an initialization circuit. When the display device is powered on, the initialization circuit controls to connect the first node and the second voltage terminal under the control of the initial control signal to control the potential of the first node to be the second voltage, and the output control circuit controls to connect the first control node and the second node under the control of the potential of the first node.

Figure 20:
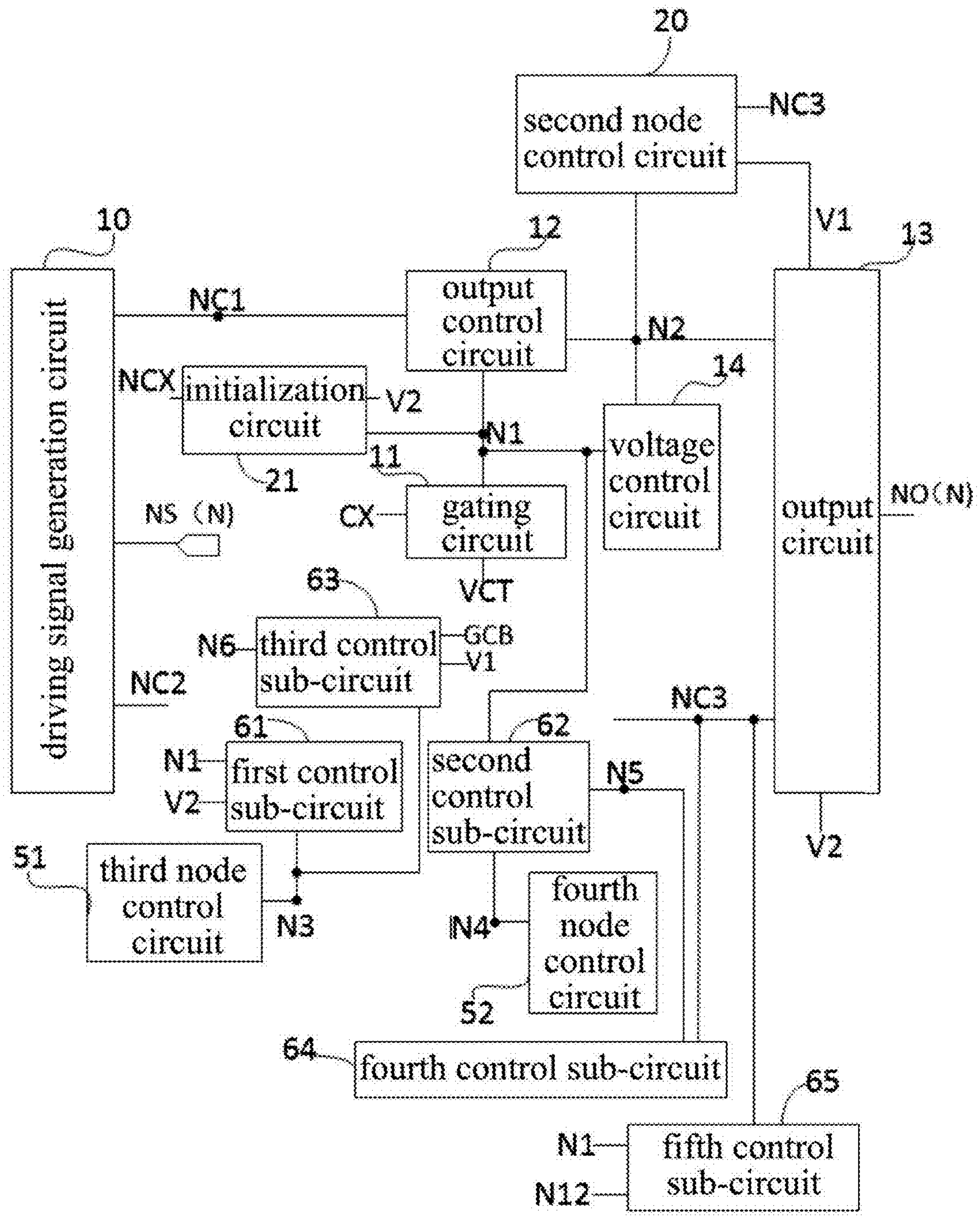
FIG. 20 is a structural diagram of a driving circuit according to at least one embodiment of the present disclosure.

As shown in FIG. 20, based on at least one embodiment of the driving circuit shown in FIG. 19, the driving circuit may further include an initialization circuit 21;

The initialization circuit 21 is electrically connected to the initial control terminal NCX, the first node N1 and the second voltage terminal V2 respectively, and is configured to control to connect the first node N1 and the second voltage terminal V2 under the control of the initial control signal provided by the initial control terminal NCX.

Optionally, the initialization circuit includes a fifteenth transistor;

a gate electrode of the fifteenth transistor is electrically connected to the initial control terminal, a first electrode of the fifteenth transistor is electrically connected to the first node, and a second electrode of the fifteenth transistor is electrically connected to the second voltage terminal.

In at least one embodiment of the present disclosure, the driving signal generation circuit includes a first driving output circuit, a second driving output circuit, a first control node control circuit and a second control node control circuit;

The first control node control circuit is configured to control the potential of the first control node;

The second control node control circuit is configured to control the potential of the second control node;

The first driving output circuit is electrically connected to the first control node, the first voltage terminal and the Nth stage of driving signal output terminal respectively, and is configured to control to connect the Nth stage of driving signal output terminal and the first voltage terminal under the control of the potential of the first control node;

The second driving output circuit is electrically connected to the second control node, the second voltage terminal and the Nth stage of driving signal output terminal respectively, and is configured to control to connect the Nth stage of driving signal output terminal and the second voltage terminal under the control of the potential of the second control node.

Figure 21:
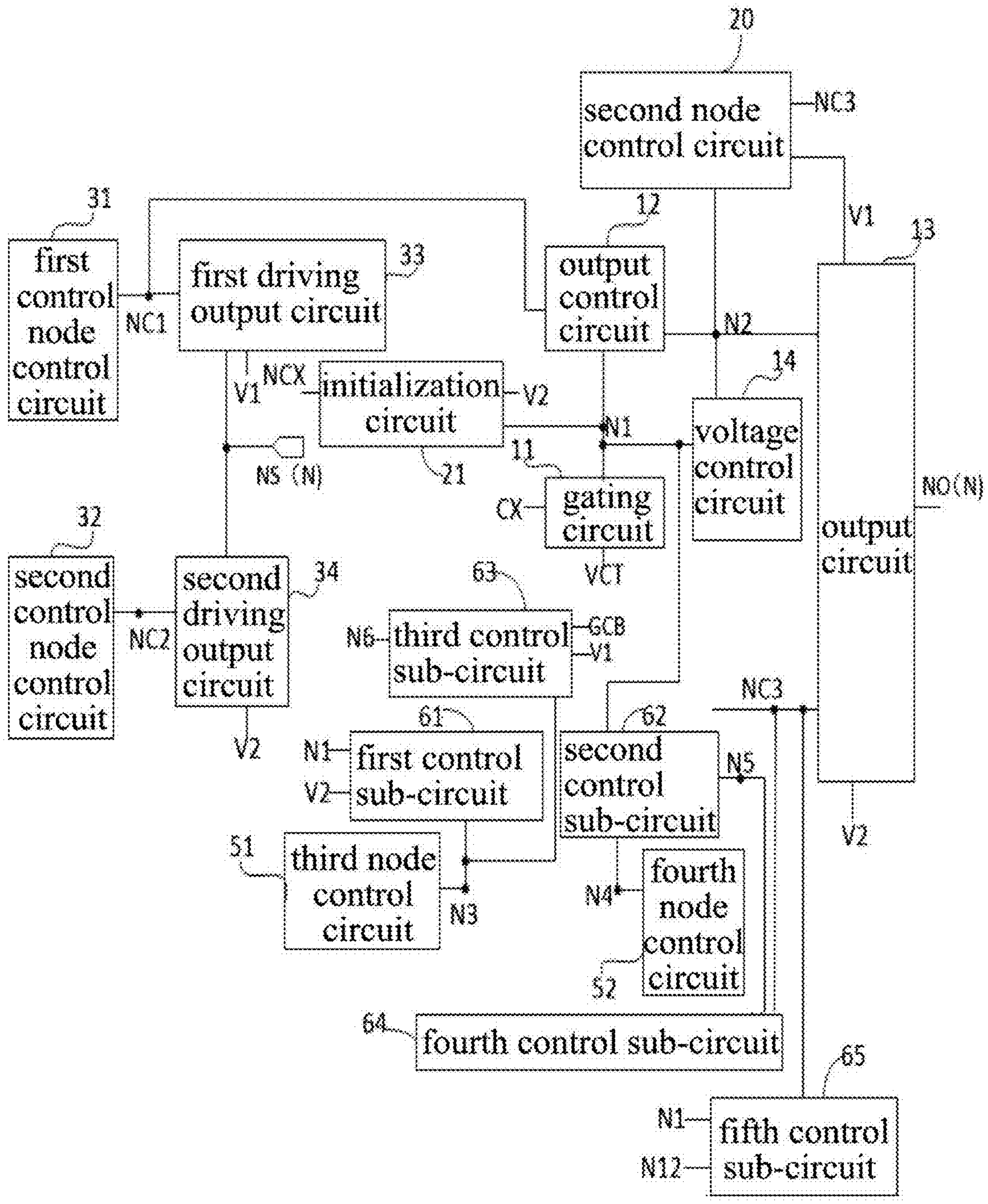
FIG. 21 is a structural diagram of a driving circuit according to at least one embodiment of the present disclosure.

As shown in FIG. 21, based on at least one embodiment of the driving circuit shown in FIG. 20, the driving signal generation circuit also includes a first control node control circuit 31, a second control node control circuit 32, a first driving output circuit 33 and a second driving output circuit 34;

The first control node control circuit 31 is electrically connected to the first control node NC1 and is configured to control the potential of the first control node NC1;

The second control node control circuit 32 is electrically connected to the second control node NC2 and is configured to control the potential of the second control node NC2;

The first driving output circuit 33 is electrically connected to the first control node NC1, the first voltage terminal V1 and the Nth stage of driving signal output terminal NS (N) respectively, and is configured to control to connect the Nth stage of driving signal output terminal NS (N) and the first voltage terminal V1 under the control of the potential of the first control node NC1;

The second driving output circuit 34 is electrically connected to the second control node NC2, the Nth stage of driving signal output terminal NS (N) and the second voltage terminal V2 respectively, and is configured to control to connect the Nth stage driving signal output terminal NS (N) and the second voltage terminal V2 under the control of the potential of the second control node NC2.

In at least one embodiment of the present disclosure, the first control node control circuit includes a tenth node control circuit, an eleventh node control circuit, a ninth node control circuit and a first control circuit;

The tenth node control circuit is electrically connected to the tenth node, the second voltage terminal, the second clock signal terminal and the twelfth node respectively, is configured to control to connect the tenth node and the second voltage terminal under the control of the second clock signal provided by the second clock signal terminal, and control to connect the tenth node and the second clock signal terminal under the control of the potential of the twelfth node;

The eleventh node control circuit is electrically connected to the second voltage terminal, the tenth node and the eleventh node respectively, and is configured to control to connect the tenth node and the eleventh node under the control of the second voltage signal provided by the second voltage terminal;

The ninth node control circuit is electrically connected to the eleventh node, the first clock signal terminal and the ninth node respectively, and is configured to control to connect the ninth node and the first clock signal terminal under the control of the potential of the eleventh node, and control the potential of the ninth node according to the potential of the eleventh node;

The first control circuit is electrically connected to the first clock signal terminal, the ninth node, the first control node, the twelfth node and the first voltage terminal respectively, and is configured to control to connect the ninth node and the first control node under the control of the first clock signal provided by the first clock signal terminal, and control to connect the first control node and the first voltage terminal under the control of the potential of the twelfth node.

In specific implementation, the first control node control circuit may include a tenth node control circuit, an eleventh node control circuit, a ninth node control circuit and a first control circuit; the tenth node control circuit is configured to control to connect the tenth node and the second voltage terminal under the control of the second clock signal, and control to connect the tenth node and the second clock signal terminal under the control of the potential of the twelfth node; the eleventh node control circuit controls to connect the tenth node and the eleventh node under the control of the second voltage signal; the ninth node control circuit controls to connect the ninth node and the first clock signal terminal under the control of the potential of the eleventh node, and control the potential of the ninth node according to the potential of the eleventh node; the first control circuit controls to connect the ninth node and the first control node under the control of the first clocks signal, and control to connect the first control node and the first voltage terminal under the control of the potential of the twelfth node.

In at least one embodiment of the present disclosure, the second control node control circuit includes an eighth node control circuit, a twelfth node control circuit and a second control circuit;

The eighth node control circuit is electrically connected to the second voltage terminal, the fourth node, the eighth node and the third node respectively, and is configured to control to connect the fourth node and the eighth node under the control of the second voltage signal provided by the second voltage terminal, and control the potential of the eighth node according to the potential of the third node;

The twelfth node control circuit is electrically connected to the (N−1)th stage of driving signal output terminal, the second clock signal end, the twelfth node, the initial control terminal and the first voltage terminal, and is configured to control to connect the twelfth node and the (N−1)th stage of driving signal output terminal under the control of the second clock signal provided by the second clock signal terminal, and control to connect the twelfth node and the first voltage terminal under the control of the initial control signal provided by the initial control terminal;

The second control circuit is electrically connected to the second voltage terminal, the twelfth node, the fourth node and the second control node respectively, and is configured to control to connect the twelfth node and the second control node under the control of the second voltage signal provided by the second voltage terminal, and control the potential of the second control node according to the potential of the fourth node.

In specific implementation, the second control node control circuit may include an eighth node control circuit, a twelfth node control circuit and a second control circuit; the eighth node control circuit controls, under the control of the second voltage signal, to connect the fourth node and the eighth node, and control the potential of the eighth node according to the potential of the third node; the twelfth node control circuit is configured to control to connect the twelfth node and the (N−1)th stage of driving signal output terminal under the control of the second clock signal, and control to connect the twelfth node and the first voltage terminal under the control of the initial control signal; the second control circuit is configured to control to connect the twelfth node and the second control node under the control of the second voltage signal, and controls the potential of the second control node according to the potential of the fourth node.

Figure 22:
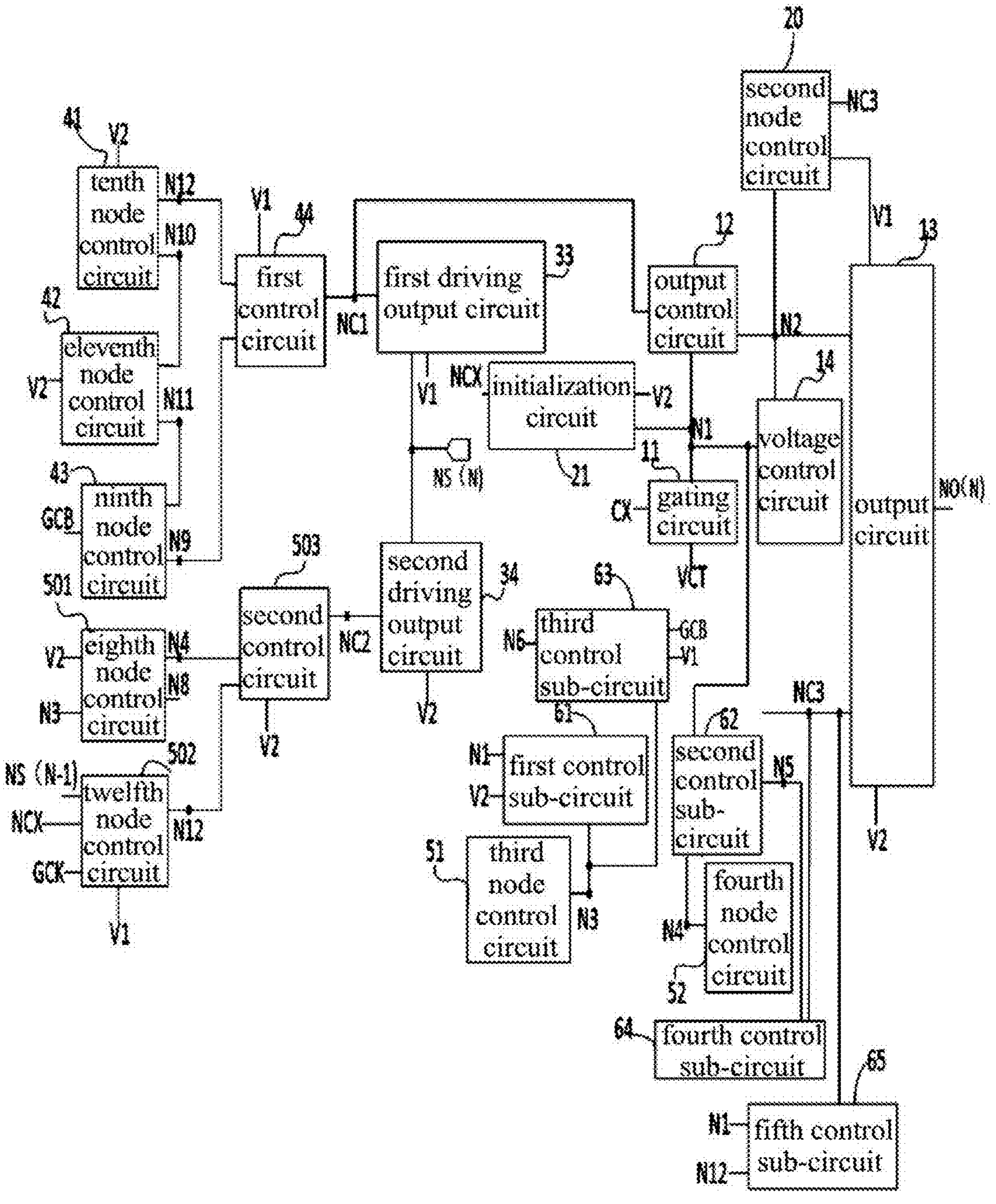
FIG. 22 is a structural diagram of a driving circuit according to at least one embodiment of the present disclosure.

As shown in FIG. 22, based on at least one embodiment of the driving circuit shown in FIG. 21, The first control node control circuit includes a tenth node control circuit 41, an eleventh node control circuit 42, a ninth node control circuit 43 and a first control circuit 44;

The tenth node control circuit 41 is electrically connected to the tenth node N10, the second voltage terminal V2, the second clock signal terminal GCK and the twelfth node N12 respectively, and is configured to control to connect the tenth node N10 and the second voltage terminal V2 under the control of provide the second clock signal provided by the second clock signal terminal GCK, and control to connect the tenth node N10 and the second clock signal terminals GCK under the control of the potential of the twelfth node N12;

The eleventh node control circuit 42 is electrically connected to the second voltage terminal V2, the tenth node N10 and the eleventh node N11 respectively, and is configured to control to connect the tenth node N10 and the eleventh node N11 under the control of the second voltage signal provided by the second voltage terminal V2;

The ninth node control circuit 43 is electrically connected to the eleventh node N11, the first clock signal terminal GCB and the ninth node N9 respectively, and is configured to control to connect the ninth node N9 and the first clock signal terminal GCB under the control of the potential of the eleventh node N11, and control the potential of the ninth node N9 according to the potential of the eleventh node N11;

The first control circuit 44 is electrically connected to the first clock signal terminal GCB, the ninth node N9, the first control node NC1, the twelfth node N12 and the first voltage terminal V1 respectively, is configured to control to connect the ninth node N9 and the first control node NC1 under the control of the first clock signal provided by the first clock signal terminal GCB, and control to connect the first control node NC1 and the first voltage terminal V1 under the control of the potential of the twelfth node N12;

The second control node control circuit includes an eighth node control circuit 501, a twelfth node control circuit 502 and a second control circuit 503;

The eighth node control circuit 501 is electrically connected to the second voltage terminal V2, the fourth node N4, the eighth node N8 and the third node N3 respectively, is configured to control to connect the fourth node N4 and the eighth node N8 under the control of the second voltage signal provided by the second voltage terminal V2, and control the potential of the eighth node N8 according to the potential of the third node N3;

The twelfth node control circuit 502 is electrically connected to the (N−1)th stage of driving signal output terminal NS (N−1), the second clock signal terminal GCK, the twelfth node N12, the initial control terminal NCX and the first voltage terminal V1 respectively, is configured to control to connect the twelfth node N12 and the (N−1)th stage of driving signal output terminal NS (N−1) under the control of the second clock signal provided by the second clock signal terminal GCK, and control to connect the twelfth node N12 and the first voltage terminal V1 under the control of the initial control signal provided by the initial control terminal NCX;

The second control circuit 503 is electrically connected to the second voltage terminal V2, the twelfth node N12, the fourth node N4 and the second control node NC2 respectively, and is configured to control to connect the twelfth node N12 and the second control node NC2 under the control of the second voltage signal provided by the second voltage terminal V2, and control the potential of the second control node NC2 according to the potential of the fourth node N4.

Optionally, the tenth node control circuit includes a sixteenth transistor and a seventeenth transistor, the eleventh node control circuit includes an eighteenth transistor, and the ninth node control circuit includes a nineteenth transistor and a third capacitor, the first control circuit includes a twentieth transistor and a twenty-first transistor;

a gate electrode of the sixteenth transistor is electrically connected to the second clock signal terminal, a first electrode of the sixteenth transistor is electrically connected to the second voltage terminal, and a second electrode of the sixteenth transistor is electrically connected to the tenth node;

a gate electrode of the seventeenth transistor is electrically connected to the twelfth node, a first electrode of the seventeenth transistor is electrically connected to the tenth node, and a second electrode of the seventeenth transistor is electrically connected to the second clock signal terminal;

a gate electrode of the eighteenth transistor is electrically connected to the second voltage terminal, a first electrode of the eighteenth transistor is electrically connected to the tenth node, and a second electrode of the eighteenth transistor is electrically connected to the eleventh node;

a gate electrode of the nineteenth transistor is electrically connected to the eleventh node, a first electrode of the nineteenth transistor is electrically connected to the first clock signal terminal, and a second electrode of the nineteenth transistor is electrically connected to the ninth node;

a gate electrode of the twentieth transistor is electrically connected to the first clock signal terminal, a first electrode of the twentieth transistor is electrically connected to the ninth node, and a second electrode of the twentieth transistor is electrically connected to the first control node;

a gate electrode of the twenty-first transistor is electrically connected to the twelfth node, a first electrode of the twenty-first transistor is electrically connected to the first control node, and a second electrode of the twenty-first transistor is electrically connected to the first voltage terminal.

Optionally, the eighth node control circuit includes a twenty-second transistor and a fourth capacitor, the twelfth node control circuit includes a twenty-third transistor and a twenty-fourth transistor, and the second control circuit includes a twenty-fifth transistor and a twenty-sixth transistor;

a gate electrode of the twenty-second transistor is electrically connected to the second voltage terminal, a first electrode of the twenty-second transistor is electrically connected to the fourth node, and a second electrode of the twenty-second transistor is electrically connected to the eighth node;

a first end of the fourth capacitor is electrically connected to the third node, and a second end of the fourth capacitor is electrically connected to the eighth node;

a gate electrode of the twenty-third transistor is electrically connected to the second clock signal terminal, and a first electrode of the twenty-third transistor is electrically connected to the (N−1)th stage of driving signal output terminal; a second electrode of the twenty-third transistor is electrically connected to the twelfth node;

a gate electrode of the twenty-fourth transistor is electrically connected to the initial control terminal, a first electrode of the twenty-fourth transistor is electrically connected to the first voltage terminal, and a second electrode of the twenty-fourth transistor is electrically connected to the twelfth node;

a gate electrode of the twenty-fifth transistor is electrically connected to the second voltage terminal, a first electrode of the twenty-fifth transistor is electrically connected to the twelfth node, and a second electrode of the twenty-fifth transistor is electrically connected to the second control node NC2;

a gate electrode of the twenty-sixth transistor and a first electrode of the twenty-sixth transistor are electrically connected to the eighth node, and a second electrode of the twenty-sixth transistor is electrically connected to the second control node.

Optionally, the first driving output circuit includes a twenty-seventh transistor and a fifth capacitor, and the second driving output circuit includes a twenty-eighth transistor and a sixth capacitor;

a gate electrode of the twenty-seventh transistor is electrically connected to the first control node, a first electrode of the twenty-seventh transistor is electrically connected to the first voltage terminal, and a second electrode of the twenty-seventh transistor is electrically connected to the Nth stage of driving signal output terminal;

a first end of the fifth capacitor is electrically connected to the first control node, and a second end of the fifth capacitor is electrically connected to the first voltage end;

a gate electrode of the twenty-eighth transistor is electrically connected to the second control node, a first electrode of the twenty-eighth transistor is electrically connected to the Nth stage of driving signal output terminal, and a second electrode of the twenty-eighth transistor is electrically connected to the second voltage terminal;

a first end of the sixth capacitor is electrically connected to the Nth stage of driving signal output terminal, and a second end of the sixth capacitor is electrically connected to the second voltage terminal.

Figure 23:
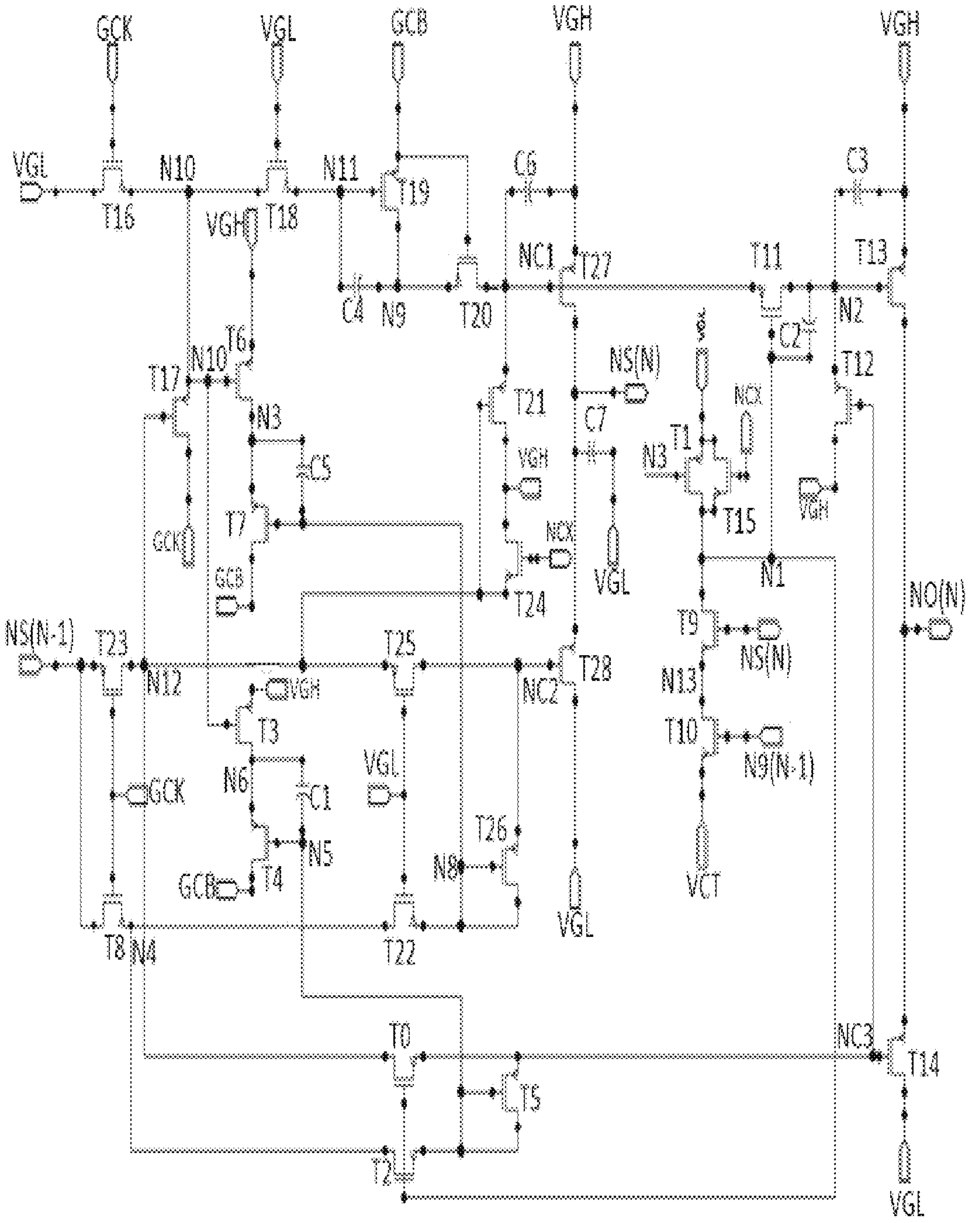
FIG. 23 is a circuit diagram of a driving circuit according to at least one embodiment of the present disclosure.

As shown in FIG. 23, in at least one embodiment of the driving circuit shown in FIG. 22, The first control sub-circuit includes a first transistor T1, and the second control sub-circuit includes a second transistor T2;

The gate electrode of the first transistor T1 is electrically connected to the third node N3, the source electrode of the first transistor T1 is electrically connected to the low voltage terminal VGL, and the drain electrode of the first transistor T1 is electrically connected to the first node N1;

The gate electrode of the second transistor T2 is electrically connected to the first node N1, the source electrode of the second transistor T2 is electrically connected to the fourth node N4, and the drain electrode of the second transistor T2 is electrically connected to the fifth node N5;

The third control sub-circuit includes a third transistor T3, a fourth transistor T4 and a first capacitor C1;

The gate electrode of the third transistor T3 is electrically connected to the third node N3, the source electrode of the third transistor T3 is electrically connected to the high voltage terminal VGH, and the drain electrode of the third transistor T3 is electrically connected to the sixth node N6;

The gate electrode of the fourth transistor T4 is electrically connected to the fifth node N5, the source electrode of the fourth transistor T4 is electrically connected to the sixth node N6, and the drain electrode of the fourth transistor T4 is connected to the first clock signal terminal GCB;

The fifth control sub-circuit includes a control transistor T0;

The gate electrode of the control transistor T0 is electrically connected to the first node N1, the source electrode of the control transistor T0 is electrically connected to the twelfth node N12, and the drain electrode of the control transistor T0 is electrically connected to the third control node NC3;

The first end of the first capacitor C1 is electrically connected to the sixth node N6, and the second end of the first capacitor C1 is electrically connected to the fifth node N5;

The fourth control sub-circuit includes a fifth transistor T5;

The gate electrode of the fifth transistor T5 is electrically connected to the fifth node N5, the source electrode of the fifth transistor T5 is electrically connected to the fifth node N5, and the drain electrode of the fifth transistor T5 is electrically connected to the third control node NC3;

The third node control circuit includes a sixth transistor T6 and a seventh transistor T7, and the fourth node control circuit includes an eighth transistor T8;

The gate electrode of the sixth transistor T6 is electrically connected to the tenth node N10, the source electrode of the sixth transistor T6 is electrically connected to the high voltage terminal VGH, and the drain electrode of the sixth transistor T6 is electrically connected to the third node N3;

The gate electrode of the seventh transistor T7 is electrically connected to the eighth node N8, the source electrode of the seventh transistor T7 is electrically connected to the first clock signal terminal GCB, and the drain electrode of the seventh transistor T7 is electrically connected to the third node N3;

The gate electrode of the eighth transistor T8 is electrically connected to the second clock signal terminal GCK, and the source electrode of the eighth transistor T8 is electrically connected to the (N−1)th stage of driving signal output terminal NS (N−1), the drain electrode of the eighth transistor T8 is electrically connected to the fourth node N4;

The gating circuit includes a ninth transistor T9 and a tenth transistor T10;

The gate electrode of the ninth transistor T9 is electrically connected to the Nth stage of driving signal output terminal NS (N), the drain electrode of the ninth transistor T9 is electrically connected to the first node N1, and the drain electrode of the ninth transistor T9 is electrically connected to the drain electrode of the tenth transistor T10;

The gate electrode of the tenth transistor T10 is electrically connected to the (N−1)th stage of the ninth node N9 (N−1), and the source electrode of the tenth transistor T10 is electrically connected to the gating input terminal VCT;

The output control circuit includes an eleventh transistor T11;

The gate electrode of the eleventh transistor T11 is electrically connected to the first node N1, the source electrode of the eleventh transistor T11 is electrically connected to the first control node NC1, and the drain electrode of the eleventh transistor T11 is electrically connected to the second node N2;

The voltage control circuit includes a second capacitor C2;

The first end of the second capacitor C2 is electrically connected to the first node N1, and the second end of the second capacitor C2 is electrically connected to the second node N2;

The second node control circuit includes a twelfth transistor T12;

The gate electrode of the twelfth transistor T12 is electrically connected to the third control node NC3, the source electrode of the twelfth transistor T12 is electrically connected to the second node N2, and the drain electrode of the twelfth transistor T12 is electrically connected to the high voltage terminal VGH;

The output circuit includes a thirteenth transistor T13, a fourteenth transistor T14 and a third capacitor C3;

The gate electrode of the thirteenth transistor T13 is electrically connected to the second node N2, the source electrode of the thirteenth transistor T13 is electrically connected to the high voltage terminal VGH, and the drain electrode of the thirteenth transistor T13 is electrically connected to the output driving terminal NO (N);

The gate electrode of the fourteenth transistor T14 is electrically connected to the third control node NC3, and the source electrode of the fourteenth transistor T14 is electrically connected to the output driving terminal NO (N), the drain electrode of T14 is electrically connected to the low voltage terminal VGL;

The first end of the third capacitor C3 is electrically connected to the second node N2, and the second end of the third capacitor C3 is electrically connected to the high voltage terminal VGH;

The initialization circuit includes a fifteenth transistor T15;

The gate electrode of the fifteenth transistor T15 is electrically connected to the initial control terminal NCX, the source electrode of the fifteenth transistor T15 is electrically connected to the first node N1, and the drain electrode of the fifteenth transistor T15 is electrically connected to the low voltage terminal;

The tenth node control circuit includes a sixteenth transistor T16 and a seventeenth transistor T17, the eleventh node control circuit includes an eighteenth transistor T18, and the ninth node control circuit includes a nineteenth transistor T19 and a fourth capacitor C4, the first control circuit includes a twentieth transistor T20 and a twenty-first transistor T21;

The gate electrode of the sixteenth transistor T16 is electrically connected to the second clock signal terminal GCK, the source electrode of the sixteenth transistor T16 is electrically connected to the low voltage terminal VGL, and the drain electrode of the sixteenth transistor T16 is electrically connected to the tenth node N10;

The gate electrode of the seventeenth transistor T17 is electrically connected to the twelfth node N12, the source electrode of the seventeenth transistor T17 is electrically connected to the tenth node N10, and the drain electrode of the seventeenth transistor T17 is electrically connected to the second clock signal terminal GCK;

The gate electrode of the eighteenth transistor T18 is electrically connected to the low voltage terminal VGL, the source electrode of the eighteenth transistor T18 is electrically connected to the tenth node N10, and the second electrode of the eighteenth transistor T18 is electrically connected to the eleventh node N11;

The gate electrode of the nineteenth transistor T19 is electrically connected to the eleventh node N11, the source electrode of the nineteenth transistor T19 is electrically connected to the first clock signal terminal GCB, and the drain electrode of the nineteenth transistor T19 is electrically connected to the ninth node N9;

The gate electrode of the twentieth transistor T20 is electrically connected to the first clock signal terminal GCB, the source electrode of the twentieth transistor T20 is electrically connected to the ninth node N9, and the drain electrode of the twentieth transistor T20 is electrically connected to the first control node NC1;

The gate electrode of the twenty-first transistor T21 is electrically connected to the twelfth node N12, the source electrode of the twenty-first transistor T21 is electrically connected to the first control node NC1, and the drain electrode of the twenty-first transistor T21 is electrically connected to the high voltage terminal;

The first end of the fourth capacitor C4 is electrically connected to the eleventh node N11, and the second end of the fourth capacitor C4 is electrically connected to the ninth node N9;

The eighth node control circuit includes a twenty-second transistor T22 and a fifth capacitor C5, the twelfth node control circuit includes a twenty-third transistor T23 and a twenty-fourth transistor T24, and the second control circuit includes the twenty-fifth transistor T25 and the twenty-sixth transistor T26;

The gate electrode of the twenty-second transistor T22 is electrically connected to the low voltage terminal VGL, the source electrode of the twenty-second transistor T22 is electrically connected to the fourth node N4, and the drain electrode of the twenty-second transistor T22 is electrically connected to the eighth node N8;

The first end of the fifth capacitor C5 is electrically connected to the third node N3, and the second end of the fifth capacitor C5 is electrically connected to the eighth node N8;

The gate electrode of the twenty-third transistor T23 is electrically connected to the second clock signal terminal GCK, and the source electrode of the twenty-third transistor T23 is electrically connected to the (N−1)th stage of driving signal output terminal NS (N−1), the drain electrode of the twenty-third transistor T23 is electrically connected to the twelfth node N12;

The gate electrode of the twenty-fourth transistor T24 is electrically connected to the initial control terminal NCX, the source electrode of the twenty-fourth transistor T24 is electrically connected to the high voltage terminal VGH, and the drain electrode of the twenty-fourth transistor T24 is electrically connected to the twelfth node N12;

The gate electrode of the twenty-fifth transistor T25 is electrically connected to the second clock signal terminal GCK, the source electrode of the twenty-fifth transistor T25 is electrically connected to the twelfth node N12, the drain electrode of the twenty-fifth transistor T5 is electrically connected to the second control node NC2;

The gate electrode of the twenty-sixth transistor T26 and the source electrode of the twenty-sixth transistor T26 are electrically connected to the eighth node N8, and the drain electrode of the twenty-sixth transistor T26 is connected to the second control node NC2;

The first driving output circuit includes a twenty-seventh transistor T27 and a sixth capacitor C6, and the second driving output circuit includes a twenty-eighth transistor T28 and a seventh capacitor C7;

The gate electrode of the twenty-seventh transistor T27 is electrically connected to the first control node NC1, and the source electrode of the twenty-seventh transistor T27 is electrically connected to the high voltage terminal VGH, the drain electrode of the twenty-seventh transistor T27 is electrically connected to the Nth stage of driving signal output terminal NS (N);

The first end of the sixth capacitor C6 is electrically connected to the first control node NC1, and the second end of the sixth capacitor C6 is electrically connected to the high voltage terminal VGH;

The gate electrode of the twenty-eighth transistor T28 is electrically connected to the second control node NC2, the source electrode of the twenty-eighth transistor T28 is electrically connected to the Nth stage of driving signal output terminal NS (N), and the drain electrode of the twenty-eighth transistor T28 is electrically connected to the low voltage terminal VGL;

The first end of the seventh capacitor C7 is electrically connected to the Nth stage of driving signal output terminal NS (N), and the second end of the seventh capacitor C7 is electrically connected to the low voltage terminal VGL.

In FIG. 23, the node labeled N13 is the thirteenth node.

In at least one embodiment shown in FIG. 23, all transistors are p-type transistors, but are not limited to this.

When at least one embodiment of the driving circuit shown in FIG. 23 of the present disclosure is working, When NS (N) and N9 (N−1) provide low voltage signals at the same time, T9 and T10 are turned on, and the gating input terminal VCT is connected to N1. At this time, the potential of N3 is a high voltage and T1 is turned off;

When T9 and T10 are turned on and VCT inputs a low voltage signal, the potential of N1 is a low voltage, T11, T0 and T2 are turned on, N2 and NC1 are connected, NC3 and N12 are connected, and N5 and N4 are connected. The voltage signal output by NO (N) is the same as the voltage signal output by NS (N);

When T9 and T10 are turned on and VCT inputs a high voltage signal, the potential of N1 is a high voltage, T11, T0 and T2 are turned off, the potential of NC3 is maintained at a low voltage, T14 and T12 are turned on, and the potential of N2 is high voltage, so as to turn off T13, the potential of N5 is a low voltage to turn on T4. When the potential of the first clock signal provided by GCB jumps from a high voltage to a low voltage, N6 and GCB are connected, and the potential of N5 is continuously pulled down to a more negative voltage through C1, so as to turn on T5, charge the negative voltage to NC3, ensure that T14 continues to be turned on, and ensure that NO (N) maintains outputting a low voltage signal, so that the gate electrode of the transistor in the pixel circuit that is electrically connected to NO (N) is turned off, no data voltage is written.

When at least one embodiment of the driving circuit shown in FIG. 23 of the present disclosure is working, When the potential of N1 is a high voltage, the initial low voltage of N5 is given by T2. At this time, the potential of N5 can be −4V, and the potential of N3 is a high-frequency pulse. When the potential of N3 is a low voltage, T3 and T4 are turned on, and GCB and N6 are connected, so that the potential of N6 jumps between −4V and −20V. T5 is turned on, which can maintain the potential of the gate electrode of T14 at a low voltage.

When at least one embodiment of the driving circuit shown in FIG. 23 of the present disclosure is working, the state of the gating input signal within one row of scanning time can be obtained by turning on the gating of NS (N) and N9 (N−1) at the same time, and N1 is written-in, then NS (N) and N9 (N−1) will not be turned on at the same time, preventing the potential of N1 from being affected by the voltage change of the gating input signal provided by VCT. When VCT inputs a low voltage signal, the potential of N1 is a low voltage, ensuring that the voltage signal output by NO (N) is the same as the voltage signal output by NS (N); when VCT inputs a high voltage signal, the potential of N1 is a high voltage, ensuring the NS (N) is isolated from NO (N), so that NO (N) can maintain the output of low voltage signals.

In at least one embodiment of the present disclosure, the structure of the driving signal generation circuit is not limited to that shown in FIG. 22. The driving signal generation circuit can be, for example, a 16T3C circuit, a 13T3C circuit, a 12T3C circuit, a 10T3C circuit, etc., but not limited thereto.

When at least one embodiment of the driving circuit shown in FIG. 23 of the present disclosure is working, When NS (N−1) outputs a low voltage signal and GCK provides a low voltage signal, T23 and T8 are turned on, to control the potential of N12 and the potential of N4 to be a low voltage, and T25 and T26 are turned on to ensure that the potential of NC2 and the potential of N8 are a low voltage, to turn on T28, pull up the potential of NC1 to Vgh (Vgh is the voltage value of the high voltage signal provided by VGH), and ensure that T27 is turned off;

When the potential of the second clock signal provided by GCK is increased from a low voltage to a high voltage, T23 and T8 are turned off, the potential of N12 is a low voltage, T17 is turned on, GCK provides a high voltage signal, and T16 is turned off, so that the potential of N10 and the potential of N11 are a high voltage, T19 is turned off, the potential of N9 maintains the high voltage of the previous phase, GCB provides a low voltage signal, T9 is turned on, so that the potential of NC1 remains at a high voltage, T27 is turned off; at the same time, the potential of N8 is a low voltage, T7 is turned on, GCB writes the low-voltage signal into N3, and pulls the potential of N8 down to a lower voltage through C5 (5V-10V lower than Vgl (Vgl is the voltage value of the low-voltage signal provided by VGL)), T26 and T5 are turned on, to write the low voltage to NC2 and N8 (the potential of NC2 and N8 can be 3V-8V lower than Vgl), fully turn on T28 and T14 to ensure that NS (N) and NO (N) output low voltage signals;

When NS (N−1) outputs a high voltage signal, when GCK provides a low voltage signal, T23 and T8 are turned on, so that the potential of N12 and the potential of N4 are a high voltage, VGL turns on T25 and T26, the potential of NC2 and the potential of N8 is a high voltage, to turn off T28; the potential of N8 is a high voltage, to turn off T7, the potential of N12 is a high voltage, to turn off T17, GCK provides a low voltage signal, to turn on T16, pull down the potential of N10 and N11, to turn on T19, GCB writes the high voltage signal into N9, T20 is turned off, the potential of N12 is a high voltage, T21 is turned off, and the potential of NC1 is maintained at a high voltage to ensure that T27 is turned off;

The potential of the second clock signal provided by GCK is increased from a low voltage to a high voltage, T23 and T8 are turned off, the potential of N12 is a high voltage, T17 is turned off, GCK provides a high voltage signal, T16 is turned off, and the potential of N10 and N11 are maintained at the low voltage, T19 is turned on, the first clock signal provided by GCB is adjusted from a high voltage to a low voltage, to turn on T20, write the low voltage to N9 and NC1, turn on T27, NS (N) outputs a high voltage signal; at the same time, the potential of N8 is the high voltage, to turn off T7, the potential of N3 remains unchanged, and the potential of N8 is a high voltage;

When the potential of the signal output by NS (N−1) is adjusted from a high voltage to a low voltage, GCK provides a high voltage signal, to turns off T23 and T8, the potential of N12 and the potential of N4 are maintained at the high voltage, and the potential of the remaining node is maintained at the potential of the previous phase, NS (N) outputs a high voltage signal;

When the potential of the second clock signal output by GCK is adjusted from a high voltage to a low voltage, to turn on T23 and T8, control the potential of N12 and the potential of N4 to be a low voltage, to turn on T25 and T26, and ensure that the potential of NC2 and the potential of N8 are low voltage, turn on T28; the potential of N8 is a low voltage, to ensure that T7 is turned on, the potential of N12 is a low voltage, to turn on T17, GCK provides a low voltage signal, to turn on T7, pull down the potential of N10 and N11, turn on T19, GCB writes the high voltage signal into N9, the potential of N12 is a low voltage, turn on T21, and pull up the potential of NC1 to a high voltage to ensure that T27 is turned off.

When at least one embodiment of the driving circuit shown in FIG. 23 of the present disclosure is working, In the first phase, when NS (N−1) outputs a low voltage signal, GCK outputs a low voltage signal, and GCB outputs a high voltage signal, T23 and T8 are turned on to pull down the potential of N12 and N4, T25 and T22 are turned on to pull down the potential of NC2 and N8, T28 is turned on; the potential of N8 is a low voltage, ensure that T7 is turned on, the potential of N12 is a low voltage, turn on T17, GCK provides a low voltage signal, to turn on T16 and T18, the potential of N10 and the potential of N11 are a low voltage, T95 is turned on to control the potential of N9 to be a high voltage, the potential of N12 is a low voltage, to turn on T21, the potential of NC1 is a high voltage; the potentials of T26 and NC3 are both a low voltage;

In the second phase, NS (N−1) outputs a low voltage signal, the potential of the second clock signal output by GCK jumps from a low voltage to a high voltage, GCB outputs a low voltage signal, T23 and T8 are turned off, and the potential of N12 is a low voltage, T16 is turned off, the potential of N12 is maintained at a low voltage, T17 is turned on, T18 is turned on, the potentials of N10 and N11 are a high voltage, T19 is turned off, the potential of N9 is maintained at the high voltage of the previous phase, and T20 is turned on to maintain the potential of NC1 at a high voltage, and T27 is turned off; at the same time, the potential of N8 is a low voltage, T7 is turned on, GCB writes the low voltage signal into N3, and pull the potential of N8 down to a lower voltage through C5 (5-10V lower than the voltage value of the low voltage signal provided by GCB), T26 is turned on, and the low voltage signal is written into NC2 (the potential of NC2 is 3-8V lower than the voltage value of the low voltage signal provided by GCB), T28 is fully turned on, and the NS (N) output is a low voltage signal; the potential of NC3 is a low voltage, T14 is turned on, and NO (N) outputs a low voltage signal; the potential of N3 is a low voltage, T1 is turned on to pull down the potential of N1; T0 is turned on to control the potential of NC3 to be a low voltage, T14 is turned on, and NO (N) outputs a low voltage signal; since the potential of N3 is a low voltage, T22 is turned on to control the potential of N1 to be a low voltage, and T11 is turned on to control to connect NC1 and N2, and the potential of N2 is a high voltage, T13 is turned off;

In the third phase, NS (N−1) outputs a high voltage signal, GCK outputs a low voltage signal, GCB outputs a high voltage signal, T23 and T8 are turned on to pull up the potentials of N12 and N4, T25 and T22 are turned on, the potentials of NC2 and N8 are a high voltage, T28 is turned off; the potential of N8 is a high voltage, T7 is turned off, the potential of N12 is a high voltage, T17 is turned off, GCK outputs a low voltage signal to turn on T16, and turn on T18, to pull down the potential of N10 and the potential of N11, to turn on T19, GCB writes the high voltage signal into N9, T20 is turned off, the potential of N12 is a high voltage, to turn off T21, the potential of NC1 is a high voltage; ensure that T27 is turned off; T6 is turned on, the potential of N3 is a high voltage, T1 is turned off; the potentials of NC1 and NC2 are both a high voltage, NS (N) continues to output a low voltage signal to T26;

In the third phase, N3 (N−1) and NS (N) output low voltage signals, T9 and T10 are turned on, and VCT and N1 are connected;

In the third phase, when VCT provides a high voltage signal, the potential of N1 is a high voltage, T0 is turned off, T11 is turned off, and the potential of N2 is maintained at a high voltage; T0 is turned off, NC3 and N12 are disconnected, and the potential of N8 is a high voltage, T26 is turned off;

In the third phase, when VCT provides a high voltage signal, the potential of N1 is a high voltage, T11, T0 and T2 are turned off, the potential of NC3 is maintained at a low voltage, T14 and T12 are turned on, and the potential of N2 is a high voltage, so that T13 is turned off, and the potential of N5 is a low voltage to turn on T4. When the potential of the first clock signal provided by GCB jumps from a high voltage to a low voltage, N6 and GCB are connected, and the potential of N5 is continuously pulled down to a more negative voltage through C1, T5 is turned on and the negative voltage is charged to NC3 to ensure that T14 continues to be turned on to ensure that NO (N) maintains outputting a low voltage signal;

In the third phase, when VCT provides a low voltage signal, the potential of N1 is a low voltage, T0 is turned on, T11 is turned on, NC1 and N2 are connected, the potential of N2 is a high voltage, T13 is turned off, and T0 is turned on to control to connect NC3 and N12, the potential of NC3 is a high voltage, and NO (N) continuously outputs a low voltage signal;

In the fourth phase, NS (N−1) outputs a high voltage signal, the potential of the second clock signal output by GCK jumps from a low voltage to a high voltage, GCB outputs a low voltage signal, T23 and T8 are turned off, and the potential of N10 is maintained at a low voltage, T18 is turned on, the potential of N11 is a low voltage, T19 is turned on, T20 is turned on to write the low voltage signal into N9 and NC1, T27 is turned on, NS (N) outputs a high voltage signal; at the same time, the potential of N8 is a high voltage, T7 is turned off, the potential of N3 is maintained at a high voltage, and the potential of N8 is maintained at a high voltage; T26 is turned off;

In the fourth phase, N9 (N−1) outputs a high voltage signal, T10 is turned off, T15 and T1 are turned off;

When the potential of N1 is a low voltage, T0 is turned on to control to connect N12 and NC3. The potential of N12 is a high voltage, the potential of NC3 is a high voltage, T14 is turned off; T11 is turned on to control to connect NC1 and N2, the potential of N2 is a low voltage, T13 is turned on, T14 is turned off, and NO (N) outputs a high voltage signal;

When the potential of N1 is a high voltage, T4 is turned off to control to disconnect N12 from NC3. The potential of NC3 is maintained at a high voltage. The potential of NC3 is maintained at the low voltage of the third phase. T14 remains to be turned on; T11 is turned off to control to disconnect NC1 from N2, the potential of N2 is maintained at a high voltage, T13 is turned off, and NO (N) continues to output a low voltage signal;

In the fifth phase, the potential of the (N−1)th stage of driving signal output by NS (N−1) jumps from a high voltage to a low voltage, GCK outputs a high voltage signal, GCB outputs a low voltage signal, T23 and T8 are turned off, and the potential of N12 and the potential of N4 are maintained at a high voltage, and the potential of other nodes remains unchanged, ensuring that NS (N) outputs a high voltage signal;

In the sixth phase, NS (N−1) outputs a low voltage signal, the potential of the first clock signal output by GCK jumps from a high voltage to a low voltage, GCB outputs a high voltage signal, T23 and T8 are turned on, to control the potentials of N12 and N4 to be a low voltage, T25 and T22 are turned on, the potentials of NC2 and N8 are a low voltage, to turn on T28, the potential of N8 is a low voltage, ensure that T7 is turned on, the potential of N12 is a low voltage, to turn on T17, T16 is turned on to pull down the potentials of N10 and N11, T19 is turned on, GCB writes the high voltage signal into N9, the potential of N12 is a low voltage, to turn on T21, and the potential of NC1 is pulled up to a high voltage, ensuring that T27 is turned off.

Optionally, when the display starts (that is, when the display device is powered on), in the reset phase before the first phase, NCX outputs a low voltage signal, T15 is turned on to control the potential of N1 to be a low voltage, and T11 is turned on to control to connect NC1 and N2; T0 is turned on to control to connect NC3 and N12; T24 is turned on to control the potential of N12 and NC3 to be a high voltage; at this time, NC1 and N2 are a low potential, T27 is turned on, T13 is turned on, NS (N) and NO (N) output the high voltage signal, which can turn on the second display control transistor M2 included in all pixel circuits in the effective display area, to clear the residual charge in the storage capacitor Cst, and improve the screen flicker at startup;

Afterwards, when NS (N) and N9 (N−1) both output low voltage signals, T9 and T10 are turned on to control to connect VCT and N1;

When VCT provides a low voltage signal, the potential of N1 is a low voltage, and C2 maintains the potential of N1; T11 is turned on to control to connect NC1 and N2. At this time, the potential of NC1 is a high voltage, the potential of N2 is a high voltage, and T13 is turned off, T0 is turned on to control to connect NC3 and N12, the potential of NC3 is a high voltage, and NO (N) continues to output a low voltage signal;

When VCT provides a high voltage signal, the potential of N1 is a high voltage, T11 is turned off, NC1 and N2 are disconnected, C2 controls the potential of N2 to be a high voltage, T0 is turned off, NC3 and N12 are disconnected, and the potential of N8 is a high voltage, T2 and T31 are turned off, the potential of NC3 is maintained at a low voltage, T14 is turned on, and NO (N) outputs a low voltage signal;

Afterwards, in the Nth stage of driving signal supply phase, NS (N) outputs a high voltage signal. At this time, the potential of NC1 is a low voltage and the potential of NC2 is a high voltage; when the potential of N1 is a low voltage, T11 is turned on and NC1 is connected to N2, the potential of N2 is a low voltage, T0 is turned on to control to connect N12 and NC3, the potential of N12 is a high voltage, the potential of NC3 is a high voltage, T14 is turned off; T13 is turned on, T14 is turned off, NO (N) outputs a high voltage signal;

When the potential of N1 is a high voltage, T11 is turned off, NC1 and N2 are disconnected, the potential of N2 is maintained at a high voltage, T0 is turned off to control to disconnect N12 from NC3, the potential of NC3 is maintained at a low voltage, T14 is turned on; T13 is turned off, NO (N) continues to output a low voltage signal;

After the Nth stage of driving signal supply phase, when the potential of N3 is a low voltage, T1 is turned on to control to connect N1 and VGL. The potential of N1 is a low voltage, and T11 is turned on to control to connect NC1 and N2. At this time, the potential of NC1 is a high voltage, the potential of NC2 is a low voltage, the potential of N2 is a high voltage, T0 is turned on to control to connect NC3 and N12, when the potential of N12 and the potential of N8 are both a low voltage, T26 is turned on, NS (N) outputs a low voltage signal, and NO (N) to output a low voltage signal.

When at least one embodiment of the driving circuit shown in FIG. 23 of the present disclosure is working, when N9 (N−1) outputs a low voltage signal and NS (N) outputs a low voltage signal, T9 and T10 are turned on, and the gating is implemented through the above two signals simultaneously, to obtain the gating input signal state within a high and low frequency switching period.

Figure 24:
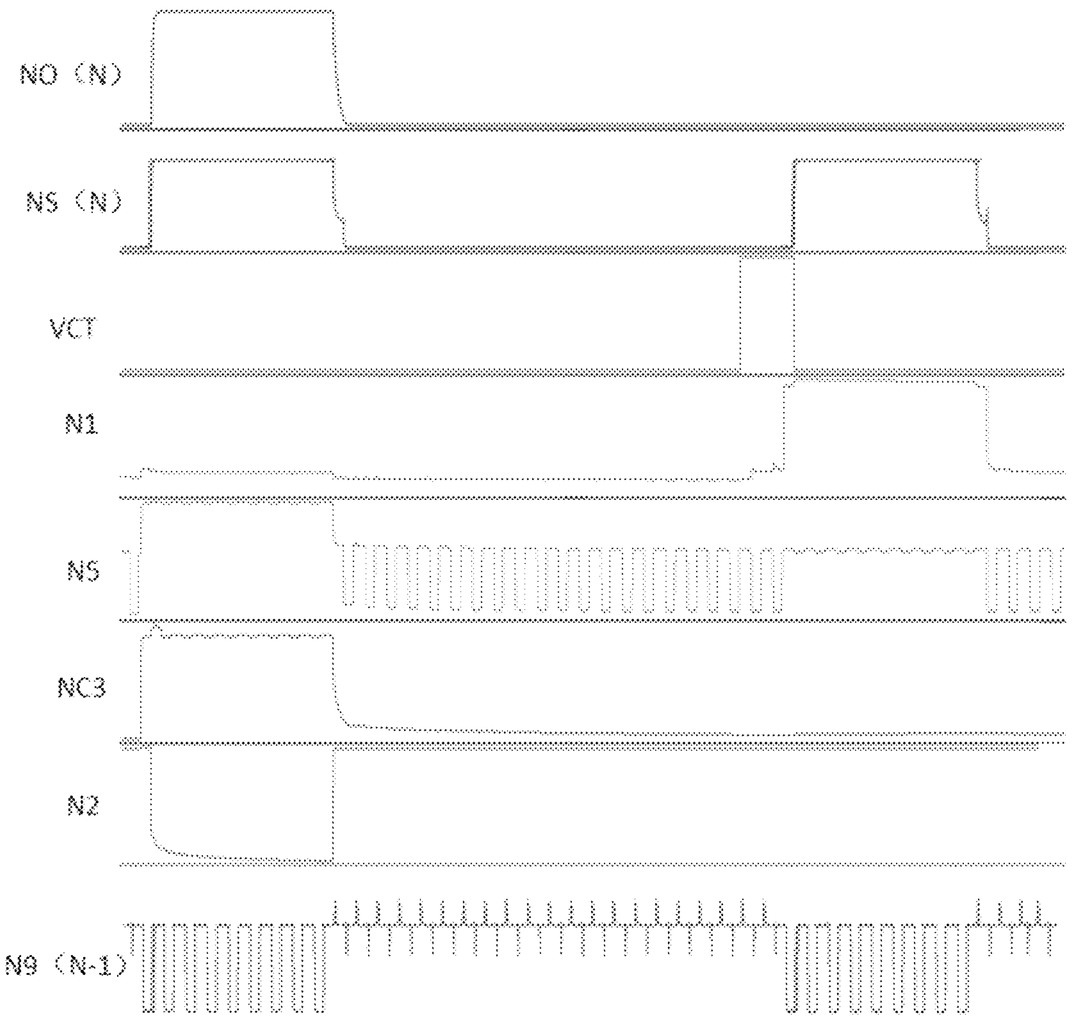
FIGS. 24, 25 and 26 are working timing diagrams of the driving circuit shown in FIG. 23 according to at least one embodiment of the present disclosure.
Figure 25:
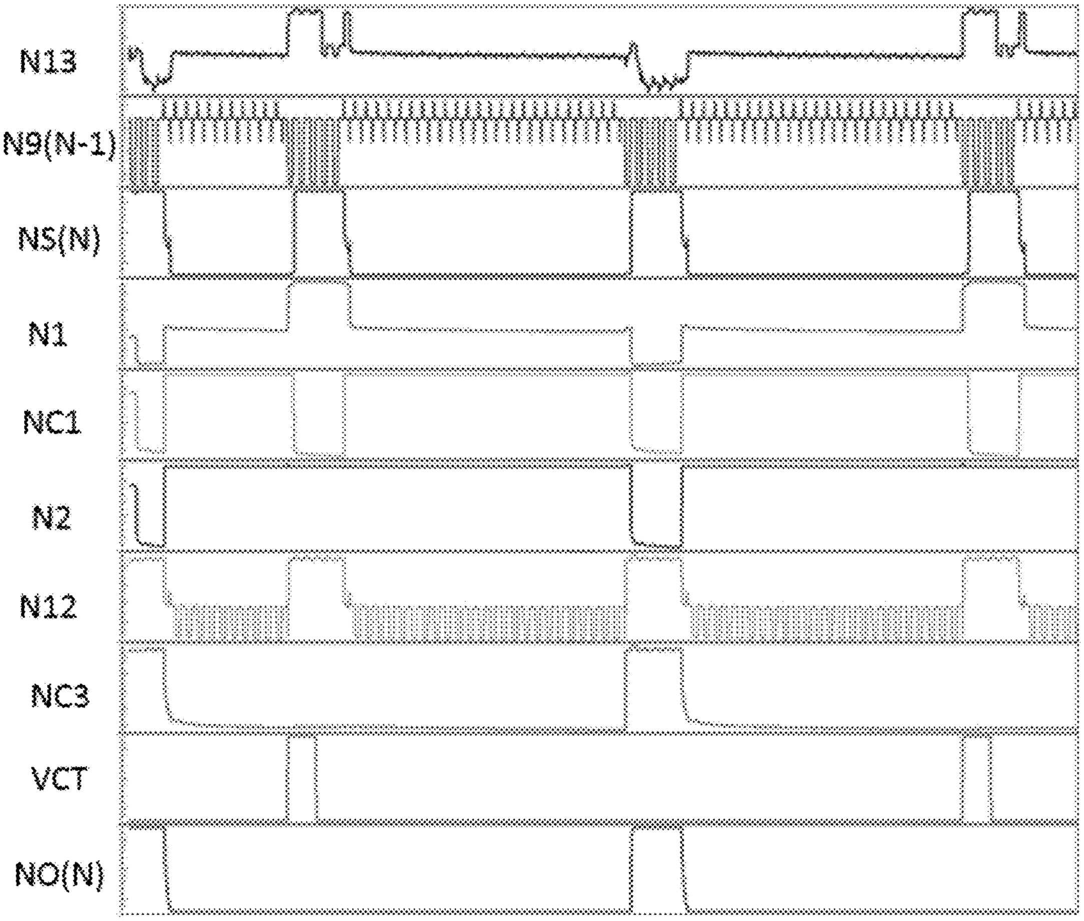
Figure 26:
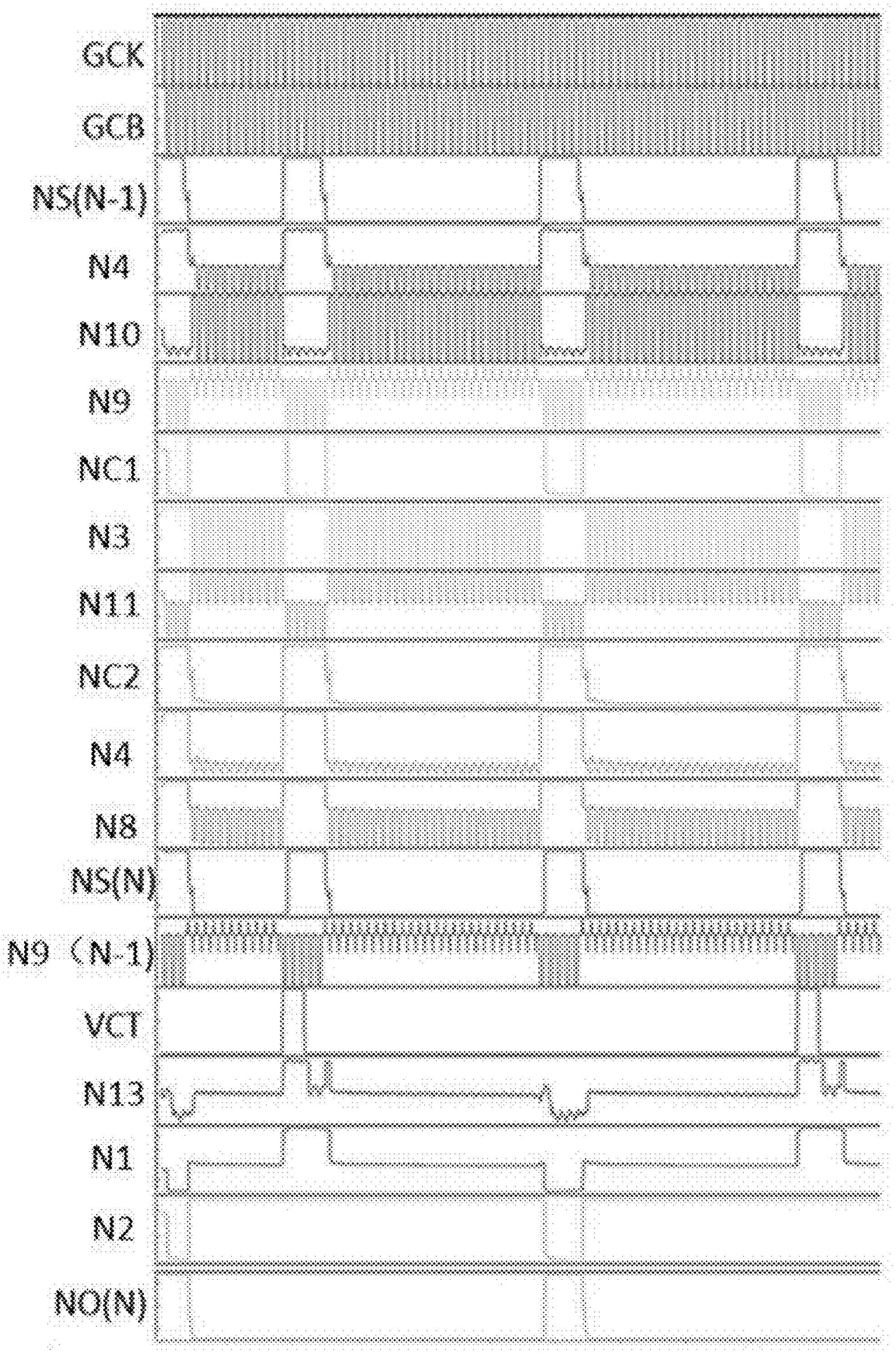

FIGS. 24, 25 and 26 are working timing diagrams of the driving circuit shown in FIG. 23 according to at least one embodiment of the present disclosure.

The driving method described in the embodiment of the present disclosure is applied to the above-mentioned driving circuit, and the driving method includes:

When the potential of the first node is the first voltage, controlling, by the third control node control circuit, the potential of the third control node to be a valid voltage, so that the output circuit generates and outputs the invalid Nth stage of output driving signal through the Nth stage of output driving terminal under the control of the potential of the third control node;

N is a positive integer.

The driving module described in the embodiment of the present disclosure includes a plurality of stages of the above-mentioned driving circuit;

The Nth stage driving circuit is electrically connected to the driving signal output terminal of the (N−1)th stage of driving circuit; N is a positive integer.

Figure 27:
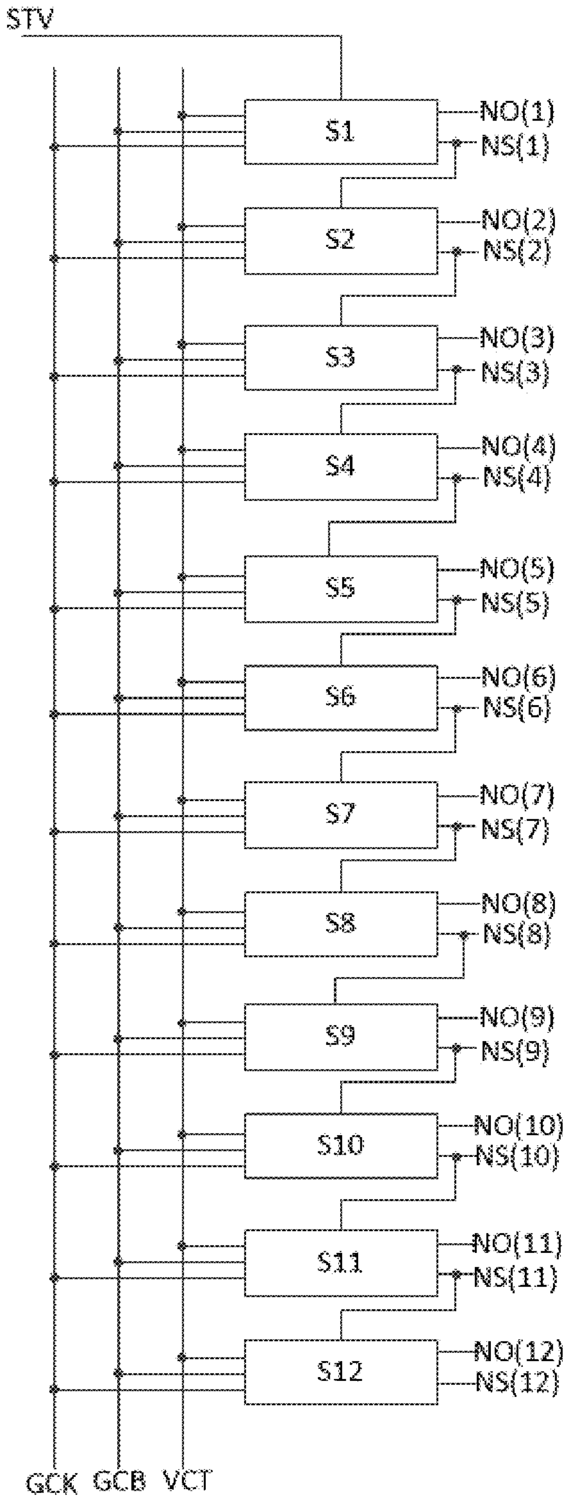
FIG. 27 is a structural diagram of a driving module according to at least one embodiment of the present disclosure.

As shown in FIG. 27, the one labeled S1 is the first-stage of driving circuit, the one labeled S2 is the second-stage of driving circuit, the one labeled S3 is the third-stage of driving circuit, the one labeled S4 is the fourth-stage of driving circuit, the one labeled S5 is the fifth-stage of driving circuit, the one labeled S6 is the sixth-stage of driving circuit, the one labeled S7 is the seventh-stage of driving circuit, the one labeled S8 is the eighth-stage of driving circuit, and the one labeled S9 is the ninth-stage of driving circuit, the one labeled S10 is the tenth-stage of driving circuit, the one labeled S11 is the eleventh-stage of driving circuit, and the one labeled S12 is the twelfth-stage of driving circuit;

The one labeled NS (1) is the driving signal output terminal of S1, and the one labeled NO (1) is the output driving terminal of S1;

The one labeled NS (2) is the driving signal output terminal of S2, and the one labeled NO (2) is the output driving terminal of S2; S2 is electrically connected to NS (1);

The one labeled NS (3) is the driving signal output terminal of S3, and the one labeled NO (3) is the output driving terminal of S3; S3 is electrically connected to NS (2);

The one labeled NS (4) is the driving signal output terminal of S4, and the one labeled NO (4) is the output driving terminal of S4; S4 is electrically connected to NS (3);

The one labeled NS (5) is the driving signal output terminal of S5, and the one labeled NO (5) is the output driving terminal of S5; S5 is electrically connected to NS (4);

The one labeled NS (6) is the driving signal output terminal of S6, and the one labeled NO (6) is the output driving terminal of S6; S6 is electrically connected to NS (5);

The one labeled NS (7) is the driving signal output terminal of S7, and the one labeled NO (7) is the output driving terminal of S7; S7 is electrically connected to NS (6);

The one labeled NS (8) is the driving signal output terminal of S8, and the one labeled NO (8) is the output driving terminal of S8; S8 is electrically connected to NS (7);

The one labeled NS (9) is the driving signal output terminal of S9, and the one labeled NO (9) is the output driving terminal of S9; S9 is electrically connected to NS (8);

The one labeled NS (10) is the driving signal output terminal of S10, and the one labeled NO (10) is the output driving terminal of S10; S10 is electrically connected to NS (9);

The one labeled NS (11) is the driving signal output terminal of S11, and the one labeled NO (11) is the output driving terminal of S11; S11 is electrically connected to NS (10);

The one labeled NS (12) is the driving signal output terminal of S12, and the one labeled NO (12) is the output driving terminal of S12; S12 is electrically connected to NS (11);

S1, S2, S3, S4, S5, S6, S7, S8, S9, S10, S11 and S12 are all electrically connected to the gating input terminal VCT;

S1, S2, S3, S4, S5, S6, S7, S8, S9, S10, S11 and S12 are all electrically connected to the first clock signal terminal GCK;

S1, S2, S3, S4, S5, S6, S7, S8, S9, S10, S11 and S12 are all electrically connected to the second clock signal terminal GCB.

In FIG. 27, the terminal labeled STV is the initial voltage terminal, and S1 is electrically connected to STV.

Figure 28:
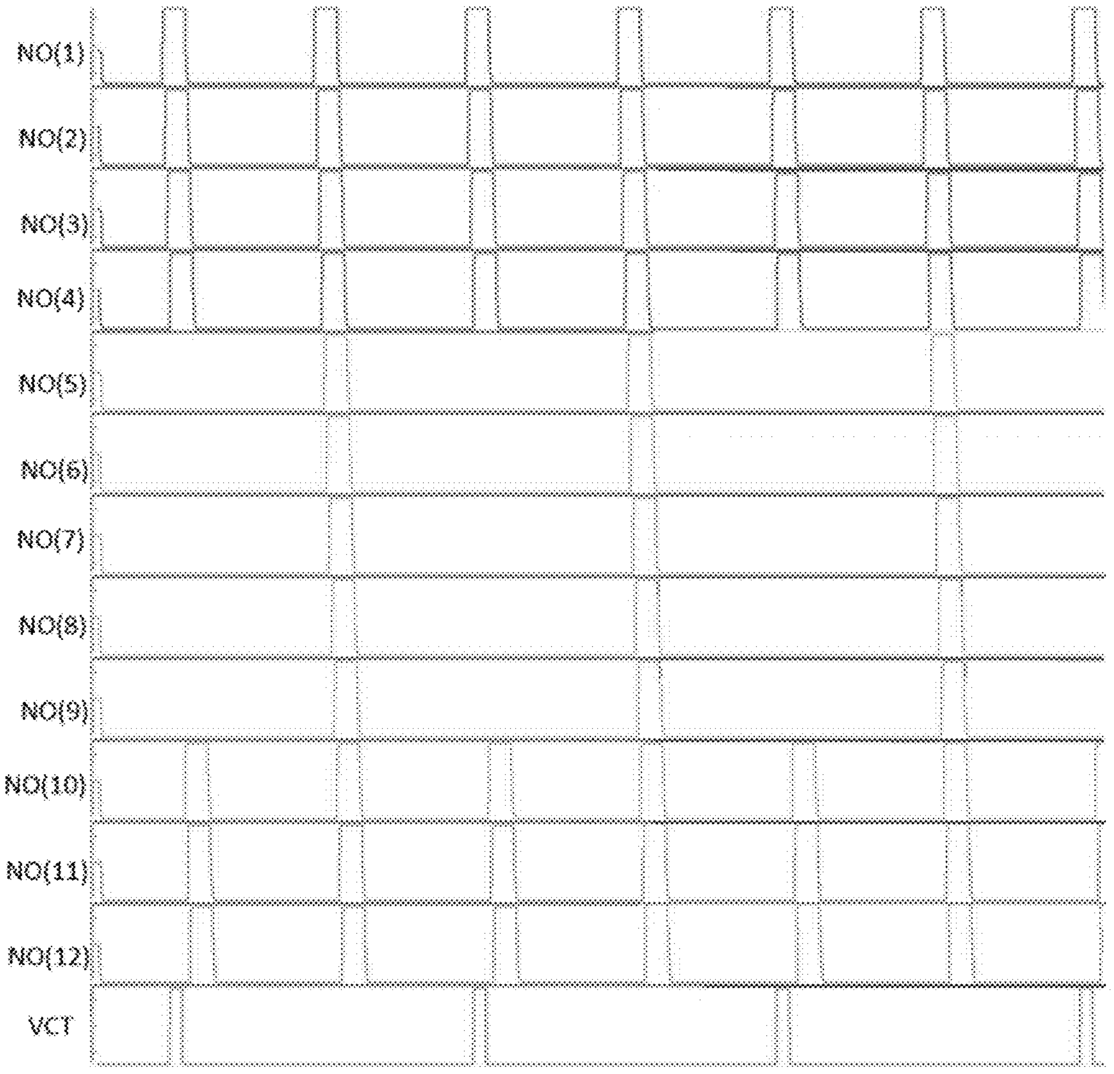
FIG. 28 is a working timing diagram of the driving module shown in FIG. 27 according to at least one embodiment of the present disclosure.

FIG. 28 is a working timing diagram of the driving module shown in FIG. 27.

Figure 29:
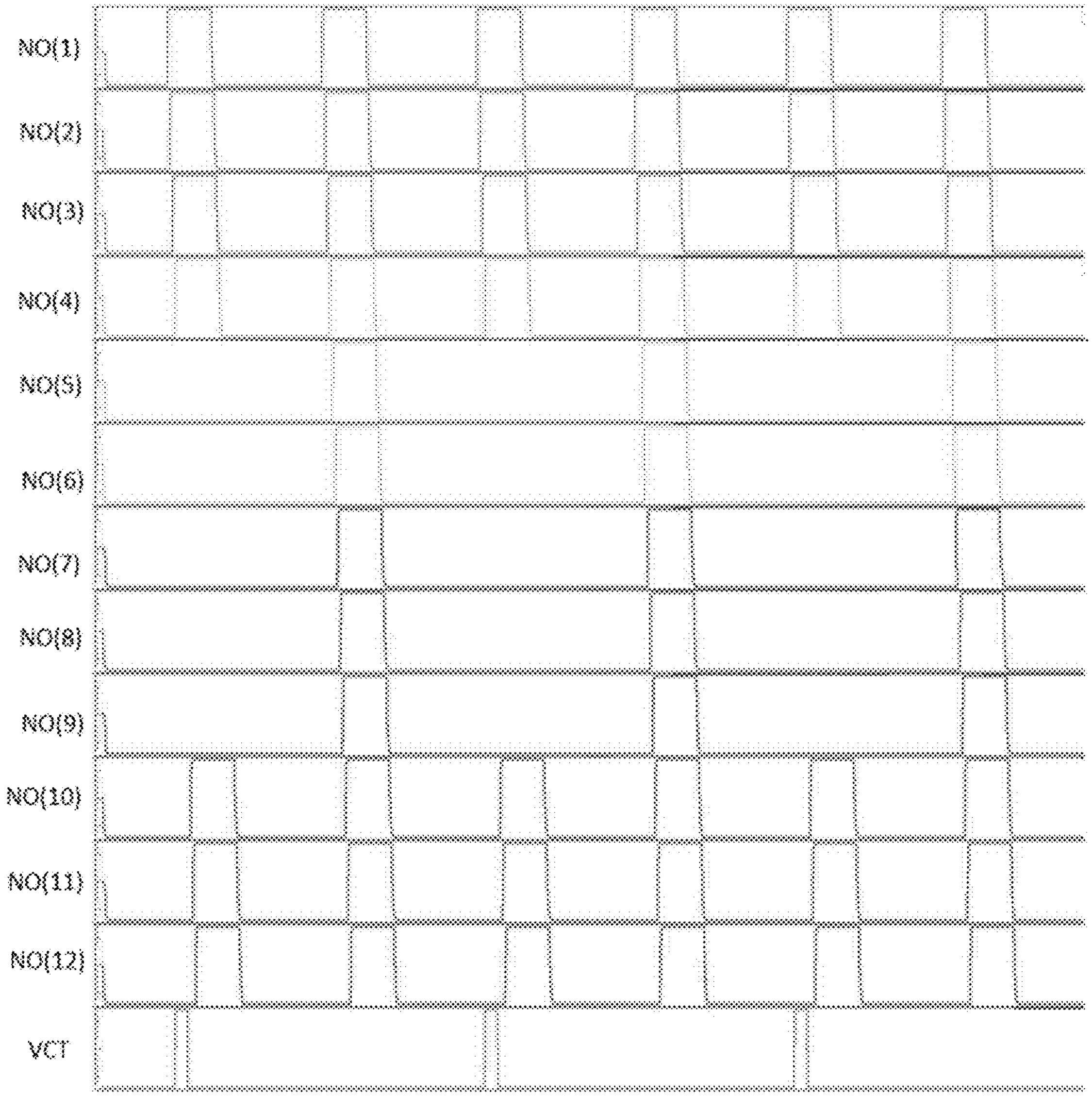
FIG. 29 is a working timing diagram of the driving module shown in FIG. 27 according to at least one embodiment of the present disclosure.

FIG. 29 is a working timing diagram of the driving module shown in FIG. 27.

When at least one embodiment of the driving module shown in FIG. 27 of the present disclosure is working, when NS (N−1) outputs a high voltage signal and NS (N) outputs a low voltage signal, if VCT outputs a low voltage signal, then when NS (N) outputs a high voltage signal, NO (N) outputs a high voltage signal;

When NS (N−1) outputs a high voltage signal and NS (N) outputs a low voltage signal, if VCT outputs a high voltage signal, then when NS (N) outputs a high voltage signal, NO (N) outputs a low voltage signal.

The display device according to the embodiment of the present disclosure includes the above-mentioned driving module.

The display device provided in the embodiment of the present disclosure can be any product or component with a display function such as a mobile phone, a tablet computer, a television, a monitor, a notebook computer, a digital photo frame, a navigator, etc.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a driving signal generation circuit, a gating circuit, an output control circuit, a voltage control circuit and an output circuit; wherein the driving signal generation circuit is configured to generate and output an Nth stage of driving signal through the Nth stage of driving signal output terminal under the control of a potential of a first control node and a potential of a second control node;

the gating circuit is electrically connected to a first node and a gating input terminal respectively;

the output control circuit is electrically connected to the first node, the first control node and a second node respectively, and is configured to control to connect the first control node and the second node under the control of the potential of the first node;

the voltage control circuit is electrically connected to the first node;

the output circuit is electrically connected to the second node, the third control node, a first voltage terminal, a second voltage terminal and an output driving terminal respectively, and is configured to control to connect the output driving terminal and the first voltage terminal under the control of a potential of the second node, and control to connect the output driving terminal and the second voltage terminal under the control of a potential of the third control node;

N is a positive integer.

2. The driving circuit according to claim 1, wherein the gating circuit is configured to control to write a gating input signal provided by the gating input terminal into the first node when a potential of an Nth stage of driving signal is the second voltage.

3. The driving circuit according to claim 1, wherein the gating circuit comprises a first transistor; a first electrode of the first transistor is electrically connected to the first node, and a second electrode of the first transistor is electrically connected to the gating input terminal.

4. The driving circuit according to claim 1, wherein the output control circuit comprises a third transistor;

a gate electrode of the third transistor is electrically connected to the first node, a first electrode of the third transistor is electrically connected to the first control node, and a second electrode of the third transistor is electrically connected to the second node.

5. The driving circuit according to claim 1, wherein the voltage control circuit comprises a first capacitor;

a first end of the first capacitor is electrically connected to the first node.

6. The driving circuit according to claim 1, wherein the output circuit comprises a fourth transistor;

a gate electrode of the fourth transistor is electrically connected to the second node, a first electrode of the fourth transistor is electrically connected to the first voltage terminal, and a second electrode of the fourth transistor is electrically connected to the output driving terminal.

7. The driving circuit according to claim 1, wherein the output circuit comprises a fifth transistor;

a gate electrode of the fifth transistor is electrically connected to the second control node, a first electrode of the fifth transistor is electrically connected to the output driving terminal, and a second electrode of the fifth transistor is electrically connected to the second voltage terminal.

8. The driving circuit according to claim 1, wherein the output circuit comprises a second capacitor; a first end of the second capacitor is electrically connected to the second node, and a second end of the second capacitor is electrically connected to the first voltage terminal.

9. The driving circuit according to claim 1, wherein the driving signal generation circuit comprises a first control node control circuit, a second control node control circuit, a first driving output circuit and a second driving output circuit;

the first control node control circuit is configured to control the potential of the first control node;

the second control node control circuit is configured to control the potential of the second control node;

the first driving output circuit is electrically connected to the first control node, the first voltage terminal and the Nth stage of driving signal output terminal respectively, and is configured to control to connect the Nth stage of driving signal output terminal and the first voltage terminal under the control of the potential of the first control node;

the second driving output circuit is electrically connected to the second control node, the Nth stage of driving signal output terminal and the second voltage terminal respectively, and is configured to control to connect the Nth stage of driving signal output terminal and the second voltage terminal under the control of the potential of the second control node.

10. The driving circuit according to claim 9, wherein the first control node control circuit comprises a fifth node control circuit, a sixth node control circuit, a third node control circuit and a first control circuit;

the fifth node control circuit is electrically connected to a first clock signal terminal, the second voltage terminal, a fifth node and a seventh node respectively, and is configured to control to connect the fifth node and the second voltage terminal under the control of a first clock signal provided by the first clock signal terminal, and control to connect the fifth node and the first clock signal terminal under the control of a potential of the seventh node;

the sixth node control circuit is electrically connected to the second voltage terminal, the fifth node and the sixth node respectively, and is configured to control to connect the fifth node and the sixth node under the control of a second voltage signal provided by the second voltage terminal;

the third node control circuit is electrically connected to the sixth node, a second clock signal terminal and a third node respectively, and is configured to control to connect the second clock signal terminal and the third node under the control of the potential of the sixth node, and control the potential of the third node according to the potential of the sixth node;

the first control circuit is electrically connected to the second clock signal terminal, the third node, the first control node, the first voltage terminal and the seventh node respectively, and is configured to control to connect the third node and the first control node under the control of a second clock signal provided by the second clock signal terminal, and control to connect the first control node and the first voltage terminal under the control of the potential of the seventh node.

11. The driving circuit according to claim 9, wherein the second control node control circuit comprises a fourth node control circuit, a seventh node control circuit, an eighth node control circuit and a second control circuit;

the fourth node control circuit is electrically connected to a fourth node, a fifth node, the first voltage terminal, an eighth node and a second clock signal terminal respectively, and is configured to control to connect the fourth node and the first voltage terminal under the control of the potential of the fifth node, and control to connect the fourth node and the second clock signal terminal under the control of the potential of the eighth node;

the seventh node control circuit is electrically connected to a seventh node, the (N−1)th stage of driving signal output terminal, a first clock signal terminal, an initial control terminal and the first voltage terminal, and is configured to control to connect the seventh node and the (N−1)th stage of driving signal output terminal under the control of a first clock signal provided by the first clock signal terminal, and control to connect the seventh node and the first voltage terminal under the control of an initial control signal provided by the initial control terminal;

the eighth node control circuit is electrically connected to an eighth node, the first clock signal terminal, the second voltage terminal, the (N−1)th stage of driving signal output terminal, a ninth node and a fourth node, and is configured to control to connect the ninth node and the (N−1)th stage of driving signal output terminal under the control of the first clock signal, and control to connect the ninth node and the eighth node under the control of a second voltage signal provided by the second voltage terminal, and control the potential of the eighth node according to the potential of the fourth node;

the second control circuit is electrically connected to the seventh node, the second voltage terminal, the second control node and the eighth node respectively, and is configured to control to connect the second control node and the seventh node under the control of the second voltage signal provided by the second voltage terminal, and control to connect the second control node and the eighth node under the control of the potential of the eighth node.

12. The driving circuit according to claim 10, wherein the fifth node control circuit comprises an eighth transistor and a ninth transistor;

a gate electrode of the eighth transistor is electrically connected to the first clock signal terminal, a first electrode of the eighth transistor is electrically connected to the second voltage terminal, and a second electrode of the eighth transistor is electrically connected to the fifth node;

a gate electrode of the ninth transistor is electrically connected to the seventh node, a first electrode of the ninth transistor is electrically connected to the fifth node, and a second electrode of the ninth transistor is electrically connected to the first clock signal terminal;

the third node control circuit comprises an eleventh transistor and a third capacitor;

a gate electrode of the eleventh transistor is electrically connected to the sixth node, a first electrode of the eleventh transistor is electrically connected to the second clock signal terminal, and a second electrode of the eleventh transistor is electrically connected to the third node;

a first end of the third capacitor is electrically connected to the sixth node, and a second end of the third capacitor is electrically connected to the third node;

the first control circuit comprises a twelfth transistor and a thirteenth transistor a gate electrode of the twelfth transistor is electrically connected to the seventh node, a first electrode of the twelfth transistor is electrically connected to the first control node, and a second electrode of the twelfth transistor is electrically connected to the first voltage terminal;

a gate electrode of the thirteenth transistor is electrically connected to the second clock signal terminal, a first electrode of the thirteenth transistor is electrically connected to the third node, and a second electrode of the thirteenth transistor is electrically connected to the first control node.

13. The driving circuit according to claim 10, wherein the sixth node control circuit comprises a tenth transistor;

a gate of the tenth transistor is electrically connected to the second voltage terminal, a first electrode of the tenth transistor is electrically connected to the fifth node, and a second electrode of the tenth transistor is electrically connected to the sixth node.

14. The driving circuit according to claim 11, wherein the fourth node control circuit comprises a fourteenth transistor and a fifteenth transistor;

a gate of the fourteenth transistor is electrically connected to the fifth node, a first electrode of the fourteenth transistor is electrically connected to the first voltage terminal, and a second electrode of the fourteenth transistor is electrically connected to the fourth node;

a gate of the fifteenth transistor is electrically connected to the eighth node, the first electrode of the fifteenth transistor is electrically connected to the fourth node, and the second electrode of the fifteenth transistor is electrically connected to the second clock signal terminal;

the seventh node control circuit comprises a sixteenth transistor and a seventeenth transistor;

a gate of the sixteenth transistor is electrically connected to the first clock signal terminal, the first electrode of the sixteenth transistor is electrically connected to the (N−1)th stage of driving signal output terminal, and a second electrode of the sixteenth transistor is electrically connected to the seventh node;

a gate of the seventeenth transistor is electrically connected to the initial control terminal, the first electrode of the seventeenth transistor is electrically connected to the first voltage terminal, and the second electrode of the seventeenth transistor is electrically connected to the seventh node;

the eighth node control circuit comprises a fourth capacitor;

a first end of the fourth capacitor is electrically connected to the fourth node, and a second end of the fourth capacitor is electrically connected to the eighth node;

the second control circuit comprises a twentieth transistor and a twenty-first transistor;

a gate of the twentieth transistor is electrically connected to the second voltage terminal, the first electrode of the twentieth transistor is electrically connected to the seventh node, and the second electrode of the twentieth transistor is electrically connected to the second control node;

a gate of the twenty-first transistor is electrically connected to the eighth node, a first electrode of the twenty-first transistor is electrically connected to the second control node, and a second electrode of the twenty-first transistor is electrically connected to the eighth node.

15. The driving circuit according to claim 11, wherein the eighth node control circuit comprises an eighteenth transistor and a nineteenth transistor;

a gate of the eighteenth transistor is electrically connected to the first clock signal terminal, a first electrode of the eighteenth transistor is electrically connected to the (N−1)th stage of driving signal output terminal, and a second electrode of the eighteenth transistor is electrically connected to the ninth node;

a gate of the nineteenth transistor is electrically connected to the second voltage terminal, the first electrode of the nineteenth transistor is electrically connected to the ninth node, and the second electrode of the nineteenth transistor is electrically connected to the eighth node.

16. The driving circuit according to claim 9, wherein the first driving output circuit comprises a twenty-second transistor and a fifth capacitor, and the second driving output circuit comprises a twenty-third transistor;

a gate of the twenty-second transistor is electrically connected to the first control node, the first electrode of the twenty-second transistor is electrically connected to the first voltage terminal, and the second electrode of the twenty-second transistor is electrically connected to the Nth stage of driving signal output terminal;

a first end of the fifth capacitor is electrically connected to the first control node, and a second end of the fifth capacitor is electrically connected to the first voltage terminal;

a gate of the twenty-third transistor is electrically connected to the second control node, a first electrode of the twenty-third transistor is electrically connected to the Nth stage of driving signal output terminal, and the second electrode of the twenty-third transistor is electrically connected to the second voltage terminal.

17. The driving circuit according to claim 9, wherein the first driving output circuit comprises a sixth capacitor;

the first end of the sixth capacitor is electrically connected to the Nth stage of driving signal output terminal.

18. A driving method, applied to the driving circuit according to claim 1, comprising:

the driving signal generation circuit generates and outputs an Nth stage of driving signal through the Nth stage of driving signal output terminal under the control of a potential of a first control node and a potential of a second control node;

the gating circuit is configured to write the gating input signal provided by the gating input terminal into the first node;

the output control circuit controls to connect the first control node and the second node under the control of the potential of the first node;

the voltage control circuit controls the potential of the second node based on the potential of the first node;

the output circuit controls to connect the output driving terminal and the first voltage terminal under the control of the potential of the second node, and controls to connect the output driving terminal and the second voltage terminal under the control of the potential of the third control node.

19. A driving module, comprising a plurality of stages of driving circuit according to claim 1;

an Nth stage driving circuit is electrically connected to the driving signal output terminal included in an (N−1)th stage of driving circuit; N is a positive integer.

20. A display device, comprising the driving module according to claim 19.

* * * * *